US008389634B2

(12) United States Patent
Yalvac et al.

(10) Patent No.: US 8,389,634 B2
(45) Date of Patent: Mar. 5, 2013

(54) POLYMER COMPOSITIONS COMPRISING A LOW-VISCOSITY, HOMOGENEOUSLY BRANCHED ETHYLENE α-OLEFIN EXTENDER

(75) Inventors: Selim Yalvac, Missouri City, TX (US); Teresa Karjala, Lake Jackson, TX (US); Wilson Cheung, Lake Jackson, TX (US); Brad Moncla, Lake Jackson, TX (US); Brian W. Walther, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 259 days.

(21) Appl. No.: 10/529,919

(22) PCT Filed: Sep. 26, 2003

(86) PCT No.: PCT/US03/30434
§ 371 (c)(1),
(2), (4) Date: Apr. 1, 2005

(87) PCT Pub. No.: WO2004/031292
PCT Pub. Date: Apr. 15, 2004

(65) Prior Publication Data
US 2006/0030667 A1    Feb. 9, 2006

Related U.S. Application Data

(60) Provisional application No. 60/415,639, filed on Oct. 2, 2002.

(51) Int. Cl.
  *C08L 23/00* (2006.01)
  *C08L 23/04* (2006.01)
  *C08L 23/10* (2006.01)
(52) U.S. Cl. .................. 525/240; 525/191
(58) Field of Classification Search .................. 525/240, 525/242, 98, 191; 524/481, 483, 491, 543, 524/570
See application file for complete search history.

(56) References Cited

U.S. PATENT DOCUMENTS

| | | | |
|---|---|---|---|
| 3,324,095 A | 6/1967 | Carrick et al. | |
| 3,595,942 A | 7/1971 | Wald et al. | |
| 3,645,992 A | 2/1972 | Elston | |
| 3,914,342 A | 10/1975 | Mitchell et al. | |
| 4,076,698 A | 2/1978 | Anderson et al. | |
| 4,305,990 A | 12/1981 | Kelly | |
| 4,508,771 A | 4/1985 | Peoples, Jr. et al. | |
| 4,528,790 A | 7/1985 | Lo et al. | |
| 4,544,762 A | 10/1985 | Kaminsky et al. | |
| 4,657,802 A | 4/1987 | Morman | |
| 4,663,220 A | 5/1987 | Wisneski et al. | |
| 4,812,526 A * | 3/1989 | Rifi .............................. | 525/240 |
| 4,830,907 A | 5/1989 | Sawyer et al. | |
| 4,937,299 A | 6/1990 | Ewen et al. | |
| 4,994,534 A | 2/1991 | Rhee et al. | |
| 5,015,749 A | 5/1991 | Schmidt et al. | |
| 5,026,798 A | 6/1991 | Canich | |
| 5,041,584 A | 8/1991 | Crapo et al. | |
| 5,041,585 A | 8/1991 | Deavenport et al. | |
| 5,055,438 A | 10/1991 | Canich | |
| 5,064,802 A | 11/1991 | Stevens et al. | |
| 5,093,422 A | 3/1992 | Himes | |
| 5,132,380 A | 7/1992 | Stevens et al. | |
| 5,169,706 A | 12/1992 | Collier, IV et al. | |
| 5,218,071 A | 6/1993 | Tsutsui et al. | |
| 5,246,783 A | 9/1993 | Spenadel et al. | |
| 5,260,126 A | 11/1993 | Collier, IV et al. | |
| 5,266,392 A * | 11/1993 | Land et al. ..................... | 442/400 |
| 5,272,236 A | 12/1993 | Lai et al. | |
| 5,278,272 A | 1/1994 | Lai et al. | |
| 5,288,791 A | 2/1994 | Collier, IV et al. | |
| 5,308,906 A | 5/1994 | Taylor et al. | |
| 5,322,728 A | 6/1994 | Davey et al. | |
| 5,324,580 A | 6/1994 | Allan et al. | |
| 5,332,613 A | 7/1994 | Taylor et al. | |
| 5,405,682 A | 4/1995 | Shawyer et al. | |
| 5,425,987 A | 6/1995 | Shawver et al. | |
| 5,462,807 A | 10/1995 | Halle et al. | |
| 5,462,999 A | 10/1995 | Griffin et al. | |
| 5,525,659 A * | 6/1996 | Falla et al. ..................... | 524/257 |
| 5,665,800 A | 9/1997 | Lai et al. | |
| 5,674,613 A | 10/1997 | Dharmarajan et al. | |
| 5,705,556 A | 1/1998 | Djiauw et al. | |
| 5,853,881 A | 12/1998 | Estey et al. | |
| 5,858,491 A * | 1/1999 | Geussens et al. ............. | 428/36.9 |
| 5,861,463 A * | 1/1999 | Sehanobish et al. .......... | 525/240 |
| 5,912,202 A | 6/1999 | Oskam et al. | |

(Continued)

FOREIGN PATENT DOCUMENTS

| EP | 586937 A1 | 3/1994 |
|---|---|---|
| EP | 586937 B1 | 3/1994 |

(Continued)

OTHER PUBLICATIONS

Zimm, G.H., and Stockmayer, W.H., J. Chem. Phys., 1949, p. 1301, vol. 17.
Rudin, A., Modern Methods of Polymer Characterization, 1991, pp. 103-112, John Wiley & Sons, New York.
Williams and Ward, Journal of Polymer Science, 1968, p. 621, vol. 6, Polymer Letters.
Patent Abstract of Japan; Publication No. 2002-105257; 10.04.202 "Polypropylene Resin Compostion, and Container and Medical Appliance Made of the Same", Applicant Grand Polymer Co Ltd. (13 pages—includes cover).
(1989). Rubber and Plastic Composition Compounds Handbook. *Polymer Digest (Inc.)*. Chiyoda-ku Tokyo: Rubber Digest Co.Ltd. (5 pages).
Kraton Thermoplastic Rubber; Typical Properties 1992, Shell Chemical Company "What is Kraton Rubber?" (12pages).

*Primary Examiner* — Irina S Zemel
*Assistant Examiner* — Jeffrey Lenihan

(57) ABSTRACT

A thermoplastic composition is described that comprises (i) from 1 to 99 percent by weight of the total composition of at least one thermoplastic copolymer, for example, styrene block copolymers, and (ii) from 1 to 99 percent by weight of the total composition of at least one homogeneously branched ethylene/α-olefin interpolymer, for example ethylene/1-octene, having a density of less than or equal to 0.899 g/cc and a Brookfield viscosity of greater than 500 cP (350° F.).

16 Claims, 9 Drawing Sheets

U.S. PATENT DOCUMENTS

| | | | |
|---|---|---|---|
| 6,008,262 A | 12/1999 | McKay et al. | |
| 6,054,544 A | 4/2000 | Finlayson et al. | |
| 6,107,430 A * | 8/2000 | Dubois et al. | 526/348.5 |
| 6,184,290 B1 | 2/2001 | Ahmed et al. | |
| 6,184,291 B1 | 2/2001 | Ahmed et al. | |
| 6,218,470 B1 | 4/2001 | Betso et al. | |
| 6,221,448 B1 | 4/2001 | Baetzold et al. | |
| 6,245,845 B1 | 6/2001 | Miyamori et al. | |
| 6,270,856 B1 | 8/2001 | Hendewerk et al. | |
| 6,300,398 B1 | 10/2001 | Jialanella et al. | |
| 6,319,979 B1 | 11/2001 | Dubois et al. | |
| 6,323,285 B1 | 11/2001 | Johnston et al. | |
| 6,325,956 B2 | 12/2001 | Chaudhary et al. | |
| 6,335,410 B1 | 1/2002 | Finlayson et al. | |
| 6,339,112 B1 | 1/2002 | Kauffman et al. | |
| 6,403,710 B1 * | 6/2002 | Ahmed et al. | 525/98 |
| 6,534,572 B1 | 3/2003 | Ahmed et al. | |
| 6,573,315 B1 | 6/2003 | Colvin et al. | |
| 6,582,829 B1 | 6/2003 | Quinn et al. | |
| 6,723,810 B2 | 4/2004 | Finlayson et al. | |
| 6,756,447 B2 * | 6/2004 | Castellani et al. | 525/232 |
| 7,199,180 B1 | 4/2007 | Simmons et al. | |
| 7,335,696 B2 | 2/2008 | Yalvac et al. | |
| 7,531,601 B2 | 5/2009 | Karjala et al. | |
| 2002/0061981 A1 | 5/2002 | Donald et al. | |
| 2006/0025640 A1 | 2/2006 | Karjala et al. | |
| 2006/0287444 A1 | 12/2006 | Karjala et al. | |
| 2008/0139714 A1 | 6/2008 | Yalvac et al. | |

FOREIGN PATENT DOCUMENTS

| | | |
|---|---|---|
| EP | 0712892 A1 | 5/1996 |
| JP | 10-230517 | 9/2009 |
| WO | WO-94/06859 A1 | 3/1994 |
| WO | WO-94/25647 A1 | 11/1994 |
| WO | WO-95/27756 | 10/1995 |
| WO | WO-95/30713 A1 | 11/1995 |
| WO | WO-95/33006 | 12/1995 |
| WO | WO-97/33921 A1 | 9/1997 |
| WO | WO-98/21276 | 5/1998 |
| WO | WO-9846694 | 10/1998 |
| WO | WO-99/63021 | 12/1999 |
| WO | WO-0134719 A1 | 5/2001 |
| WO | WO-01/42352 | 6/2001 |
| WO | WO-01/42352 A1 | 6/2001 |
| WO | WO-02/072691 | 9/2002 |

* cited by examiner 199901798 90/10 443 PHAE/XUS59800.04L — 15 micron

POLYMER COMPOSITIONS COMPRISING A LOW-VISCOSITY, HOMOGENEOUSLY BRANCHED ETHYLENE α-OLEFIN EXTENDER

This application is a U.S. National Stage application, under 35 U.S.C. §371, of International Application No. PCT/US03/30434, filed on Sep. 26, 2003, which claims the benefit of U.S. Provisional Application No. 60/415,639, filed on Oct. 2, 2002.

This invention relates to polymer compositions. In one aspect, the invention relates to polymer compositions comprising at least one extender while in another aspect, the invention relates to polymer compositions in which the extender is an ethylene/α-olefin copolymer. In yet another aspect, the invention relates to polymer compositions in which the extender is a homogeneously branched ethylene/α-olefin interpolymer, preferably a substantially linear ethylene/α-olefin interpolymer.

Various thermoplastic elastomeric compositions are well-known, and these compositions include thermoplastic urethanes, thermoplastic polyesters, polypropylenes, chlorinated polyethylenes, ethylene/propylene rubbers, crosslinked and uncrosslinked EPDMs (ethylene/propylene/diene) rubbers and styrene block copolymers. While some of these compositions are more expensive to manufacture than others, the value of all in many applications is enhanced if they can be compounded with one or more relatively inexpensive, inert extenders that do not significantly decrease the required performance of the composition.

For example, styrene block copolymers (styrene-isoprene-styrene (SIS), styrene-butadiene-styrene (SBS), and styrene-ethylene-butene-styrene (SEBS)) are very versatile thermoplastic elastomers that are widely used in industry, frequently for impact modification of thermoplastic resins and engineering thermoplastics or for compatiblization of different types of resins. Styrene block copolymers are recognized as strong, flexible, high-performance elastomers that do not require vulcanization and yet exhibit excellent elasticity over a wide range of service temperatures. Due to their unique molecular structure and versatility, styrene block copolymers are used in a wide spectrum of end uses such as moldable goods, automotive interior and exterior parts, and medical devices. Similar claims can be made about other thermoplastic polymers in other applications.

Styrene block copolymers are available with linear, diblock, triblock and radial molecular structures. Each polymer molecule consists of a hard styrenic block segment and a rubber or elastomer monomer block segment. The rubber segment may consist of saturated or unsaturated monomer units such as ethylene/butene, ethylene/propylene, butadiene, or isoprene. By varying the ratio of the hard styrene block to the soft elastomer block, a wide variation in properties can be achieved. In the elastomer range it is possible to achieve the high strength and elongation at break of a thermoset elastomer without the requirement for chemical crosslinks. This is the result of the physical crosslinks in the material formed by the segregation of the styrene segments of the polymer into hard domains, which provide physical crosslinks.

One deficiency in these materials is processability. The segregation of the hard segments, which provides the physical crosslinking in the solid, persists in the melt and increases melt viscosity, and melt elasticity which increases the difficulty of processing the material. To improve processability the polymers (SEBS in particular) are often diluted with a low molecular weight wax or mineral oil. Both of these diluents have inherent limitations.

Waxes are low molecular weight, highly crystalline materials. While they decrease melt viscosity, they also increase stiffness and rigidity in the final solidified formulation, which can lead to a profound loss of elastic properties, in particular elongation at break. Mineral oils, on the other hand, are liquids, which maintain or improve softness, flexibility and elongation while improving processability. Unfortunately addition of oil often results in a loss of strength at break or loss of modulus of elasticity.

U.S. Pat. Nos. 5,093,422 and 5,260,126 describe the use of polyethylene as a processing aid for styrene block copolymers. The polyethylene of choice is manufactured by Equistar Chemical Company under the trade designation Petrothene™ NA 601. This polyethylene is described as having a density of 0.903 g/cc and a melt index (m) of 2,000 g/10 min. U.S. Pat. Nos. 6,184,290, 6,184,291 and 6,218,470 describe a substantially inert extender for styrene block copolymers comprising a homogeneously branched, preferably a substantially linear, ethylene/1-octene interpolymer with a density between 0.855 to 0.905 g/cc and a MI of between 0.1 to 100 g/10 min. While effective, these extenders tend to increase stiffness of the elastomer blend particularly at low elongation, which, in turn, compromises the utility of the blends for film and fiber applications.

Accordingly, the industry has a continuing interest in identifying extenders and processing aids that not only reduce the viscosity of the base polymer (be it a styrene block copolymer or a polyester or one or more other thermoplastic polymers), to an efficient processing range, but that also imparts to the processed resin a desired range of physical and chemical properties, (including softness to the touch).

According to this invention, at least one thermoplastic polymer and at least one substantially inert extender are blended with one another such that the resulting composition is a thermoplastic composition having essentially the same elastic and/or hardness properties as the thermoplastic polymer component of the composition. The preferred substantially inert extenders are homogeneously branched ethylene/α-olefin interpolymers with a density of less than or equal to 0.899 g/cc and a Brookfield viscosity of at least 500 cPs (350° F.).

Any thermoplastic polymer can be used in the practice of this invention, and representative polymers include the natural or synthetic resins such as, but are not limited to, styrene block copolymers, rubbers, linear low density polyethylene (LLDPE), high density polyethylene (HDPE), low density polyethylene (LDPE), ethylene/vinyl acetate (EVA) copolymer, ethylene-carboxylic acid copolymers (EAA), ethylene acrylate copolymers, polybutylene, polybutadiene, nylons, polycarbonates, polyesters, polypropylene, ethylene-propylene interpolymers such as ethylene-propylene rubber, ethylene-propylene-diene monomer rubbers, chlorinated polyethylene, thermoplastic vulcanizates, ethylene ethylacrylate polymers (EEA), ethylene styrene interpolymers (ESI), polyurethanes, as well as graft-modified olefin polymers, and combinations of two or more of these polymers.

In one embodiment of the invention, the thermoplastic, elastomeric composition comprises (i) from 1 to 99% by weight of the total composition of at least one thermoplastic polymer, and (ii) from 99 to 1% by weight of the total composition of at least one homogeneously branched, ethylene/α-olefin interpolymer in which the interpolymer has a density of less than 0.899 g/cc and a Brookfield viscosity of at least 500 cP (350° F.).

In another embodiment of the invention, the thermoplastic, elastomeric composition comprises (i) from 50 to 99% by weight of the total composition of at least one styrene block copolymer, and (ii) from 1 to 50% by weight of the total composition of an extender comprising at least one substantially linear ethylene/α-olefin interpolymer. The interpolymer has a density less than or equal to 0.899 g/cc and a MI of at least 100 g/10 min. The preferred interpolymer is substantially linear ethylene/1-octene.

In other embodiment, the thermoplastic elastomeric compositions of the present invention can also be combined with other natural or synthetic resins to improve other properties. Suitable natural or synthetic resins include, but are not limited to, rubbers, natural or synthetic waxes, including, but not limited to, ABS, parrafinic or other natural or synthetic waxes and the various so called "Fischer-Tropsch waxes, LLDPE, HDPE, LDPE, EVA, ethylene-carboxylic acid copolymers, EAA, ethylene acrylate copolymers, polybutylene, polybutadiene, polystyrene, PET, thermoplastic epoxy, nylons, polycarbonates, polyesters, polypropylene, ethylene-propylene interpolymers such as ethylene-propylene rubber, ethylene-propylene-diene monomer rubber, chlorinated polyethylene, thermoplastic vulcanizates, EEA, ESI, polyurethanes, as well as graft-modified olefin polymers, and combinations of two or more of these polymers.

In other embodiment of the invention, the extender is used to further modify an existing thermoplastic polyolefin ("TPO") comprising a thermoplastic polymer and a low density, low melt flow elastomer. This resulting novel blend possesses both increased compound melt flow and improved impact resistance while retaining the other performance properties.

In another embodiment, the invention is a method of making a fabricated article, preferably in the form of a film, fiber or molding, from the thermoplastic elastomeric composition.

In other embodiment of the invention, the extender is used as a compounding ingredients or additives for asphalt modifications for crack repairing and roofing, polymer processing, impact and surface modifications, sealant and adhesive formulations, oil gel viscosity modifications, and rubber extender/binder compounding.

In yet another embodiment, the invention is a fabricated article, preferably in the form of a film, fiber or molding, made from the thermoplastic elastomeric composition.

Figure 1:
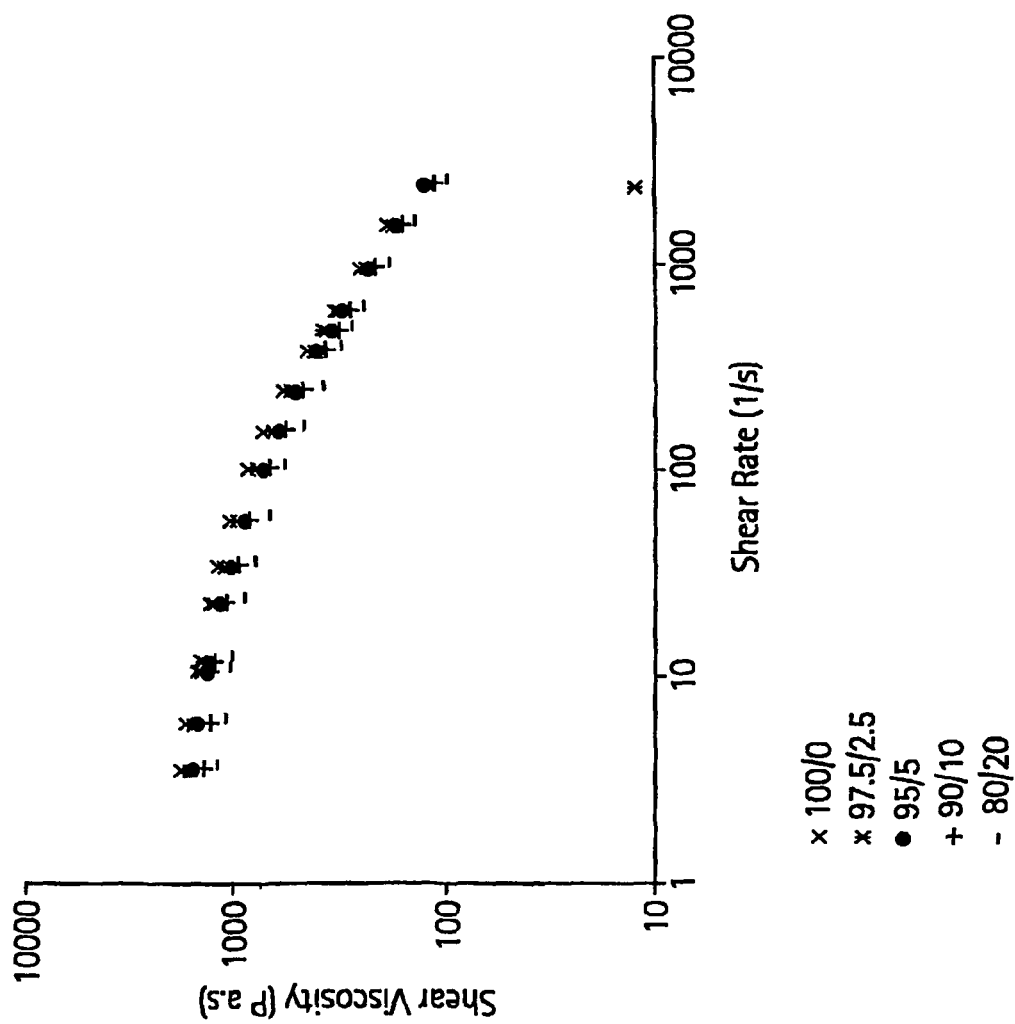
FIG. 1 is a graph reporting the shear viscosity versus shear rate of a first thermoplastic composition of this invention.

"Polymer" means a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers and comonomers. It includes, but is not limited to, copolymers (which usually refer to polymers prepared from two or more different monomers or comonomers), terpolymers (which usually refers to polymers prepared from three different types of monomers or comonomers), or tetrapolymers (which usually refers to polymers prepared from four different types of monomers or comonomers). The term "monomer" or "comonomer" refers to any compound with a polymerizable moiety, which is added to a reactor in order to produce a polymer.

"Thermoplastic polymer" or "thermoplastic composition" and similar terms mean a polymer or polymer composition that is substantially thermally extrudable or deformable albeit relatively aggressive conditions may be required.

"Extender" "inert extender", "substantially inert extender" and similar terms are used interchangeably herein and mean a thermoplastic polymer, preferably a thermoplastic elastomer, that at specified addition amounts improves processability and low temperature impact properties. Suitable substantially inert thermoelastic extenders for use in preparing the thermoplastic compositions of the present invention are homogeneously branched ethylene interpolymers, and more preferably substantially linear, homogeneously branched ethylene interpolymers. The ethylene interpolymers comprise at least one $C_3$-$C_{20}$ α-olefin.

The terms "ultra low density polyethylene" (ULDPE), "very low density polyethylene" (VLDPE) and "linear very low density polyethylene" (LVLDPE) have been used interchangeably in the polyethylene art to designate the polymer subset of linear low density polyethylenes having a density less than or equal to 0.915 g/cc. The term "linear low density polyethylene" (LLDPE) is then applied to those linear polyethylenes having a density above 0.915 g/cc. Only ethylene interpolymers having a polymer density less than or equal to 0.899 g/cc comprise the extenders used in the present invention. As such, the family known as LLDPE is not considered a part of the present invention although such may be employed to affect other enhancements.

The terms "heterogeneous" and "heterogeneously branched" are used in the conventional sense, and refer to a linear ethylene interpolymer where (1) the α-olefin comonomer is not randomly distributed within a given polymer molecule, (2) substantially all of the polymer molecules do not have the same ethylene-to-comonomer ratio, and (3) the interpolymer typically exhibits a measurable high density (crystalline) polymer fraction as measured by known fractionation techniques such as, for example, a method that involves polymer fractional elutions as a function of temperature.

Commercial examples of heterogeneously branched linear interpolymers include ATTANE* ULDPE polymers (a product and trademark of The Dow Chemical Company) and FLEXOMER™ VLDPE polymers (a product and trademark of Union Carbide Corporation, a Subsidiary of The Dow Chemical Company). However, while heterogeneously branched ethylene interpolymers can be used as the thermoplastic polymer component of the thermoplastic compositions of this invention, they are not used as the substantially inert extender component of the present invention.

"Homogeneously branched" means that in an ethylene/α-olefin interpolymer (1) the α-olefin comonomer is randomly distributed within a given polymer molecule, (2) substantially all of the polymer molecules have the same ethylene-tocomonomer ratio, and (3) the interpolymer essentially lacks a measurable high density (crystalline) polymer fraction as measured by known fractionation techniques such as, for example, a method that involves polymer fractional elutions as a function of temperature.

The homogeneously branched linear ethylene interpolymers useful for admixing with the thermoplastic polymers to prepare the thermoplastic compositions of the present invention are ethylene polymers which do not have long chain branching, but do have short chain branches derived from the comonomer polymerized into the interpolymer which are homogeneously distributed both within the same polymer chain and between different polymer chains. That is, homogeneously branched linear ethylene interpolymers have an absence of long chain branching just as is the case for the linear low density polyethylene polymers or linear high density polyethylene polymers made using uniform branching distribution polymerization processes as described, for example, by Elston in U.S. Pat. No. 3,645,992.

The homogeneously branched linear ethylene interpolymer is not the high pressure, free-radical initiated polyethylene which is well-known to those skilled in the art to have numerous long chain branches, nor is it the traditional heterogeneously branched linear low density polyethylene.

The preparation of the homogeneously branched linear ethylene/α-olefin interpolymers is not a critical aspect of the present invention. Homogeneously branched linear ethylene/α-olefin interpolymers can be prepared in conventional polymerization processes using Ziegler-type catalysts such as, for example, zirconium and vanadium catalyst systems, as well as using metallocene catalyst systems such as, for example, those based on hafnium. Ewen et al. U.S. Pat. No. 4,937,299 and Tsutsui et al. U.S. Pat. No. 5,218,071 are illustrative.

Commercial examples of homogeneously branched linear ethylene/α-olefin interpolymers include TAFMER™ polymers supplied by the Mitsui Chemical Company and EXACT™ polymers supplied by Exxon Chemical Company.

The homogeneously branched substantially linear ethylene interpolymers used in the present invention are described in U.S. Pat. Nos. 5,272,236 and 5,278,272, 6,054,544 and 6,335,410 B1. The substantially linear ethylene interpolymers useful for inertly extending thermoplastic polymers are those in which the comonomer is randomly distributed within a given interpolymer molecule and in which substantially all of the interpolymer molecules have the same ethylene/comonomer ratio within that interpolymer.

The substantially linear ethylene interpolymers used in the present invention form a unique class of homogeneously branched ethylene polymers. They differ substantially from the well-known class of conventional homogeneously branched linear ethylene interpolymers described by Elston in U.S. Pat. No. 3,645,992 and, moreover, they are not in the same class as conventional heterogeneous Ziegler catalyst polymerized linear ethylene polymers (for example, ULDPE, LLDPE or HDPE made, for example, using the technique disclosed by Anderson et al. in U.S. Pat. No. 4,076,698), nor are they in the same class as high pressure, free-radical initiated highly branched, high pressure polyethylenes such as, for example, LDPE, ethylene-acrylic acid (EAA) copolymers and EVA copolymers.

Substantially linear ethylene interpolymers are homogeneously branched ethylene polymers having long chain branching. The long chain branches have the same comonomer distribution as the polymer backbone and can have about the same length as the length of the polymer backbone. "Substantially linear" means that the bulk polymer is substituted, on average, with 0.01 long chain branches/1000 total carbons (including both backbone and branch carbons) to 3 long chain branches/1000 total carbons. Preferred polymers are substituted with 0.01 long chain branches/1000 total carbons to 1 long chain branch/1000 total carbons, more preferably from 0.05 long 15' chain branches/1000 total carbons to 1 long chain branch/1000 total carbons, and especially from 0.3 long chain branches/1000 total carbons to 1 long chain branch/1000 total carbons.

"Backbone" refers to a discrete molecule, and "polymer" or "bulk polymer" refers in the conventional sense to the polymer as formed in a reactor. For the polymer to be a "substantially linear" polymer, the polymer must have at least enough molecules with long chain branching such that the average long chain branching in the bulk polymer is at least an average of 0.01 long chain branches/1000 total carbons.

"Bulk" polymer means the polymer which results from the polymerization process and, for the substantially linear polymers, includes molecules having both an absence of long chain branching, as well as molecules having long chain branching. Thus a "bulk" polymer includes all molecules formed during polymerization. For substantially linear polymers, not all molecules have long chain branching, but a sufficient amount do such that the average long chain branching content of the bulk polymer positively effects the melt rheology (that is, the melt fracture properties).

"Long chain branching (LCB)" can be determined by conventional techniques known in the industry such as $^{13}$C nuclear magnetic resonance (NMR) spectroscopy using, for example, the method of Randall (Rev. Macromol. Chem. Phys., C29 (2&3), p. 285-297). Two other methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, for example, Zimm, G. H. and Stockmayer, W. H., J. Chem. Phys., 17, 1301 (1949) and Rudin, A., Modern Methods of Polymer Characterization, John Wiley & Sons, New York (1991) pp. 103-112.

For substantially linear ethylene interpolymers, the long chain branch is longer than the short chain branch that results from the incorporation of the α-olefin(s) into the polymer backbone. The empirical effect of the presence of long chain branching in the substantial linear ethylene interpolymers used in the invention is manifested as enhanced rheological properties which are quantified and expressed herein in terms of gas extrusion rheometry (GER) results and/or melt flow, $I_{10}/I_2$, increases.

In contrast to "homogeneously branched substantially linear ethylene polymer", "homogeneously branched linear ethylene polymer" means that the polymer lacks measurable or demonstrable long chain branches, that is, the polymer is substituted with an average of less than 0.01 long branch/1000 total carbons.

Suitable unsaturated comonomers useful for polymerizing with ethylene to prepare homogeneously branched ethylene interpolymers are ethylenically unsaturated monomers. Such comonomers are $C_3$-$C_{20}$ α-olefins such as propylene, isobutylene, 1 butene, 1-hexene, 4-methyl-1-pentene, 1-heptene, 1-octene, 1-nonene, 1-decene. Preferred comonomers include propylene, 1-butene, 1-hexene, 4-methyl-1-pentene and 1-octene, with the latter especially preferred. Other monomers that can be polymerized with ethylene in addition to the at least one $C_3$-$C_{20}$ α-olefin include styrene, halo- or alkyl-substituted styrenes, tetrafluoroethylenes, vinylbenzocyclobutanes, butadienes, isoprenes, pentadienes, hexadienes, octadienes, and cycloalkenes, for example, cyclopentene, cyclohexene and cyclooctene. Typically, the homogeneously branched ethylene interpolymer is a copolymer in which ethylene is copolymerized with one $C_3$-$C_{20}$ α-olefin. Most preferably, the homogeneously branched ethylene interpolymer is a copolymer of ethylene and 1-octene.

The density of the ethylene interpolymers used as the substantially inert extender in the present invention, as measured in accordance with ASTM D-792, is generally in the range from 0.855 to 0.899 g/cc, preferably 0.860 to 0.885 g/cc, more preferably 0.865 to 0.885 g/cc. At densities above 6.899 g/cc (in combination with the required MI range), ethylene interpolymers are generally nonelastomeric.

The Brookfield viscosity of the ethylene interpolymers used as the substantially inert extender in the practice of this invention is greater than or equal to 500 cP's and typically between 500 and 90,000, preferably between 3,000 and 70,000 and more preferably between 4,000 and 50,000 cP (350° F.). The viscosity is measured in a conventional manner as exemplified later in this document.

The molecular weight distribution of the ethylene interpolymers used as the substantially inert extender in the present invention are determined by gel permeation chromatography (GPC) on a Waters 150 high temperature chromatographic unit equipped with a differential refractometer and three columns of mixed porosity. The columns are supplied by Polymer Laboratories and are commonly packed with pore sizes of $10^3$, $10^4$, $10^5$ and $10^6$ Å. The solvent is 1,2,4-trichlorobenzene, from which 0.3 percent by weight solutions of the interpolymer samples are prepared for injection. The flow rate is 1.0 milliliter/minute and the operating temperature is 140° C. with a 100-microliter injection size.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$M_{polyethylene} = a*(M_{polystyrene})^b.$$

In this equation, a 0.4316 and b=1.0.

Number average molecular weight, $M_n$, of a polymer is expressed as the first moment of a plot of the number of molecules in each molecular weight range against the molecular weight. In effect, this is the total molecular weight of all molecules divided by the number of molecules- and is calculated in the usual manner according to the following formula:

$$Mn = \Sigma n_i * M_i / \Sigma n_i = \Sigma w_i / \Sigma (w_i/M_i)$$

where
$n_i$=number of molecules with molecular weight $M_i$
$w_i$=weight fraction of material having molecular weight $M_i$
and $\Sigma n_i$=total number of molecules Weight average molecular weight, $M_W$, is calculated in the usual manner according to the following formula: $M_W = \Sigma w_i * M_i$, where $w_i$ and $M_i$ are the weight fraction and molecular weight, respectively, of the $i^{th}$ fraction eluting from the GPC column.

The ratio of these two averages, the molecular weight distribution (MWD or $M_w/M_n$), is used herein to define the breadth of the molecular weight distribution.

For the ethylene interpolymers used as the substantially inert extender in the present invention (that is, substantially linear ethylene interpolymers and homogeneously branched linear ethylene polymers), the $M_w/M_n$ is from 1.5 to 3.0, preferably between 1.5 and 2.5.

Single site polymerization catalysts, for example, the mono cyclopentadienyl transition metal olefin polymerization catalysts described by Canich in U.S. Pat. No. 5,026,798 or by Canich in U.S. Pat. No. 5,055,438, or described by Stevens et al. in U.S. Pat. No. 5,064,802, can be used to prepare the homogeneously branched ethylene interpolymers, so long as the catalysts are used consistent with the methods described in U.S. Pat. No. 5,272,236 and in U.S. Pat. No. 5,278,272. Such polymerization methods are also described in PCT/US 92/08812, filed Oct. 15, 1992. However, homogeneously branched substantially linear ethylene interpolymers are preferably made by using suitable constrained geometry catalysts, especially constrained geometry catalysts as disclosed in U.S. Ser. No. 545,403, filed Jul. 3, 1990 and Ser. No. 758,660, filed Sep. 12, 1991, and U.S. Pat. No. 5,132,380.

Suitable cocatalysts include but are not limited to, for example, polymeric or oligomeric aluminoxanes, especially methyl aluminoxane or modified methyl aluminoxane (made, for example, as described in U.S. Pat. Nos. 5,041,584, 4,544, 762, 5,015,749, and/or 5,041,585 as well as inert, compatible, non-coordinating, ion forming compounds. Preferred cocatalysts are inert, non-coordinating, boron compounds.

The polymerization conditions for manufacturing the homogeneously branched linear and substantially linear ethylene interpolymers used in this invention are preferably those useful in the solution polymerization process, although slurry and gas phase polymerization processes are also useful for preparing suitable homogeneously branched interpolymers, provided the proper catalysts and polymerization conditions are employed. Generally, olefin polymerization temperatures range from 0 to 200° C. at atmospheric, subatmospheric, or superatmospheric pressures.

Slurry or solution polymerization processes may utilize subatmospheric or superatmospheric pressures and temperatures in the range of 40 to 250 C. A useful liquid phase polymerization reaction system is described in U.S. Pat. No. 3,324,095. Liquid phase reaction systems generally comprise a reactor vessel to which olefin monomer and catalyst composition are added, and which contains a liquid reaction medium for dissolving or suspending the polymer product. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, or toluene. Reactive contact between the olefin monomer and the catalyst composition should be maintained by constant stirring or agitation. The reaction medium containing the olefin polymer product and unreacted olefin monomer is withdrawn from the reactor continuously. The olefin polymer product is separated, and the unreacted olefin monomer and liquid reaction medium are recycled back to the reactor. Preferably, for substantially linear ethylene interpolymers, the polymerization is performed in a continuous solution polymerization process.

Gas phase polymerization is typically employed with super-atmospheric pressures in the range of 1 to 1000 psi, preferably 50 to 400 psi and most preferably 100 to 300 psi, and the temperature is in the range of 30 to 130° C., preferably 65 to 110° C. Stirred or fluidized bed gas phase reaction systems are particularly useful. Generally, a conventional gas phase, fluidized bed process is conducted by passing a stream containing one or more olefin monomers continuously through a fluidized bed reactor under reaction conditions and in the presence of the catalyst composition at a velocity sufficient to maintain a bed of solid particles, in a suspended condition. A stream containing unreacted monomer is withdrawn from the reaction continuously, compressed, cooled, optionally fully or partially condensed as disclosed in U.S. Pat. Nos. 4,528,790 and 5,462,999, and then recycled to the reactor. Product is withdrawn from the reactor and make-up monomer is added to the recycle stream. As desired for temperature control of the system, any gas inert to the catalyst composition and reactants may also be present in the gas stream. In addition, a fluidization aid such as carbon black, silica, clay or talc may be used, as disclosed in U.S. Pat. No. 4,994,534.

Multiple reactor polymerization processes can also be used in making the homogeneously branched ethylene interpolymers of the present invention, such as that described U.S. Pat. No. 3,914,342. The multiple reactors can be operated in series or in parallel or a combination thereof and/or with different catalysts-employed in the different reactors.

With respect to those embodiments of the invention in which the thermoplastic polymer component of the composition is a block copolymer, "block copolymer" means a polymer having at least one block segment of a hard polymer unit and at least one block segment of a rubber monomer unit. However, this term is not intended to include elastic, thermoplastic ethylene interpolymers which are, in general, random polymers. Preferred block copolymers contain hard segments of styrenic-type polymers in combination with saturated or unsaturated rubber monomer segments. The structure of the block copolymers useful as a thermoplastic polymer component in the present invention is not critical and can be of the linear or radial type, either diblock or triblock, or any combination of thereof. Preferably, the predominant structure is that of triblocks and more preferably that of linear triblocks.

The preparation of the block copolymers useful herein is not the subject of the present invention. Methods for the preparation of such block copolymers are known in the art. Suitable catalysts for the preparation of useful block copolymers with unsaturated rubber monomer units include lithium based catalysts and especially lithium-alkyls. U.S. Pat. No. 3,595,942 describes suitable methods for hydrogenation of block copolymers with unsaturated rubber monomer units to or block copolymers with saturated rubber monomer units. The structure of the polymers is determined by their methods of polymerization. For example, linear polymers result by sequential introduction of the desired rubber monomer into the reaction vessel when using such initiators as lithium-alkyls or dilithiostilbene, or by coupling a two segment block copolymer with a difunctional coupling agent. Branched structures, on the other hand, may be obtained by the use of suitable coupling agents having a functionality with respect to the block copolymers with unsaturated rubber monomer units of three or more. Coupling may be effected with multifunctional coupling agents such as dihaloalkanes or alkenes and divinyl benzene as well as with certain polar compounds such as silicon halides, siloxanes or esters of monohydric alcohols with carboxylic acids. The presence of any coupling residues in the polymer may be ignored for an adequate description of the block copolymers forming a part of the composition of this invention.

Suitable block copolymers having unsaturated rubber monomer units include, but are not limited to, styrene-butadiene (SB), styrene-isoprene (SI), styrene-butadiene-styrene (SBS), styrene-isoprene-styrene (SIS), α-methylstyrene-butadiene-α-methylstyrene and α-methylstyrene-isoprene-α-methylstyrene.

The styrenic portion of the block copolymer is preferably a polymer or interpolymer of styrene and its analogs and homologs including α-methylstyrene and ring-substituted styrenes, particularly ring-methylated styrenes. The preferred styrenics are styrene and α-methylstyrene, and styrene is particularly preferred.

Block copolymers with unsaturated rubber monomer units may comprise homopolymers of butadiene or isoprene and copolymers of one or both of these two dienes with a minor amount of styrenic monomer. When the monomer employed is butadiene, preferably between 35 and 55 mole percent of the condensed butadiene units in the butadiene polymer block have 1,2 configuration. Thus, when such a block is hydrogenated, the resulting product is, or resembles a regular copolymer block of ethylene and 1-butene (EB). If the conjugated diene employed is isoprene, the resulting hydrogenated product is or resembles a regular copolymer block of ethylene and propylene (EP). Preferred block copolymers with saturated rubber monomer units comprise at least one segment of a styrenic unit and at least one segment of an ethylene-butene or ethylene-propylene copolymer. Preferred examples of such block copolymers with saturated rubber monomer units include styrene/ethylene-butene copolymers, styrene/ethylene-propylene copolymers, styrene/ethylene-butene/styrene (SEBS) copolymers, and styrene/ethylene-propylene/styrene (SEPS) copolymers.

Hydrogenation of block copolymers with unsaturated rubber monomer units is preferably effected by use of a catalyst comprising the reaction products of an aluminum alkyl compound with nickel or cobalt carboxylates or alkoxides under such conditions as to substantially completely hydrogenate at least about 80 percent of the aliphatic double bonds while hydrogenating no more than 25 percent of the styrenic aromatic double bonds. Preferred block copolymers are those where at least 99 percent of the aliphatic double bonds are hydrogenated while less than 5 percent of the aromatic double bonds are hydrogenated.

The proportion of the styrenic blocks is generally between 8 and 65 percent by weight of the total weight of the block copolymer. Preferably, the block copolymers contain from 10 to 35 weight percent of styrenic block segments and from 90 to 65 weight percent of rubber monomer block segments, based on the total weight of the block copolymer.

The average molecular weights of the individual blocks may vary within certain limits. In most instances, the styrenic block segments will have number average molecular weights ($M_n$) in the range of 5,000 to 125,000, preferably from 7,000 to 60,000 while the rubber monomer block segments will have number average molecular weights in the range of 10,000 to 300,000, preferably from 30,000 to 150,000. The total number average molecular weight of the block copolymer is typically in the range of 25,000 to 250,000, preferably from 35,000 to 200,000. These molecular weights are most accurately determined by tritium counting methods or osmotic pressure measurements.

Further, the various block copolymers suitable for use in the present invention may be modified by graft incorporation of minor amounts of functional groups, such as, for example, maleic anhydride by any of the methods well known in the art.

Block copolymers useful in the present invention are commercially available, such as, for example, supplied by Shell Chemical Company under the designation of KRATON™ and supplied by Dexco Polymers under the designation of VECTOR™.

Other thermoplastic polymers can be used in the practice of this invention, and representative polymers include but are not limited to, the natural or synthetic resins such as, styrene block copolymers, rubbers, linear low density polyethylene (LLDPE), high density polyethylene (HDPE), low density polyethylene (LDPE), ethylene/vinyl acetate (EVA) copolymer, ethylene-carboxylic acid copolymers (EAA), ethylene acrylate copolymers, polybutylene, polybutadiene, nylons, polycarbonates, polyesters, polypropylene, ethylene-propylene interpolymers such as ethylene-propylene rubber, ethylene-propylene-diene monomer rubbers, chlorinated polyethylene, thermoplastic vulcanizates, ethylene ethylacrylate polymers (EEA), ethylene styrene interpolymers (ES), polyurethanes, as well as graft-modified olefin polymers, and combinations of two or more of these polymers.

Generally, the thermoplastic polymeric composition of the present invention comprises (a) from 1 to 99 percent by weight of the total composition of at least one thermoplastic polymer, and (b) from 99 to 1 percent by weight of the total composition of at least one homogeneously branched linear or substantially linear ethylene interpolymer. Preferably, the compositions of this invention comprise (a) from 50 to 95, more preferably from 60 to 90 and most preferably from 70 to 85, percent by weight of the total composition of at least one thermoplastic polymer, and (b) from 5 to 50, more preferably from 10 to 40 and most preferably from 15 to 30 percent by weight of the total composition of at least one ethylene interpolymer.

In another embodiment of the present invention the extenders used in the present invention are added to the elastomeric component of a thermoplastic polyolefin (TPO) for enhanced performance. TPO's are typically composed of two components, a matrix of a high modulus polymer such as polypropylene or high density polyethylene (HDPE), and an elastomer, the selection of which varies with the performance attributes required. However, the enhancement of one particular performance parameter in a TPO is often tied to a decrease in another property. TPO compounds often display an offsetting balance between compound melt flow, flexural modulus, low temperature impact, and compound cost. This trade-off is evident in the balance between compound viscosity and impact performance. The addition of a low melt flow and low density elastomer will result in higher impact performance, but the increase in compound viscosity often runs counter to the need for a higher flow TPO.

While economics are always of primary concern, achieving a lower viscosity often translates into overall lower system cost due to increases in injection molding efficiencies, use of lower tonnage injection molding units, and the ability to thin wall the parts For a given TPO morphology, where the elastomer is dispersed into the polypropylene matrix, higher molecular weight elastomers provide superior impact performance to elastomers of low molecular weight. This balancing between improved elastomer functionality at high molecular weight versus the need for low molecular weight and low viscosity to achieve an optimum morphology is a basic tradeoff in TPO formulations. With the increasing need for lower viscosity TPO formulations, this balance is becoming increasingly more important.

We have now discovered that the addition of ultra high melt flow, low density extender in combination with a conventional low density, low melt flow elastomer results in a novel blend which possesses both increased compound melt flow and lower compound viscosity but with improved impact resistance while retaining the other performance properties.

Thus these thermoplastic blend compositions comprise A) from 75 to 99, preferably from 80 to 98, more preferably from 85 to 97 weight percent (based on the total weight of the thermoplastic blend composition) of a thermoplastic polyolefin composition comprising; (a) from 50 to 100 wt percent of polypropylene or HDPE or a mixture thereof; and from 0 to 50 wt percent of an ethylene/α-olefin interpolymer having a density of less than or equal to 0.9130 g/cm$^3$; and B) from 1 to 25, preferably from 2 to 20, more preferably from 3 to 15 weight percent (based on the total weight of the thermoplastic blend composition) of an extender comprising an ethylene/α-olefin interpolymer other than that in component A) and having a density of less than 0.8990, preferably less than 0.8900, more preferably less than 0.8800 g/cm$^3$, and a Brookfield Viscosity at 350° F. of at least 500 cP's, preferably at least 500 but less than 70,000 cP's, more preferably at least 500 but less than 40,000 cP's, The melt index of such thermoplastic blend compositions is increased by at least 5%, preferably at least 10%, more preferably at least 15% relative to that of the analogous thermoplastic polyolefin composition, absent the extender.

In addition to being useful in many of the applications described herein for the thermoplastic composition other than those containing a TPO, the TPO extender blends have as one of their main utilities, use in automotive applications including but not limited to bumper and interior trim applications.

Certain of the compositions of this invention are characterized by their ability to carry large amounts of fillers (for example, talc, carbon black, silica, magnesium hydroxide, calcium carbonate, aluminum trihydrate, etc.) and/or other additives such as antioxidants (for example, Irganox 1010, a hindered phenolic; Irgafos 168, a phosphite; etc.), cling additives (for example, polyisobutylene), antiblock additives, colorants, pigments, waxes, nucleating agents, extender oils, flame retardants, and tackifers. The amount of filler and/or other additive that these compositions can carry depend, at least in part, on the nature of the thermoplastic polymer and the inert extender but generally, the more extender that is present, the more filler and/or other additive that the composition can carry. In some compositions of this invention, for example, styrene block copolymer/homogeneously branched, substantially linear ethylene/1-octene copolymer at a weight ratio of 50:50 or more, for example, 40:60, the amount of filler that can incorporated into the composition is limited only by the processability of the filler-containing composition and/or limited to the extent that the filler does not interfere with the substantial inertness or other enhancements of the composition, for example, a solids level of 70 wt %, 80 wt % or more based on the combined weight of the composition and filler. This high loading capacity of the inventive compositions is particularly useful in masterbatch applications, for example, using a relatively small amount of composition to introduce one or more fillers and/or additives into a much larger amount of composition.

The compositions of the present invention are compounded by any convenient method, including dry blending the individual components and subsequently melt mixing, either directly in the extruder used to make the finished article, or by pre-melt mixing in a separate extruder or mixer such as, for example, a Haake unit or a Banbury mixer.

Specific applications in which the thermoplastic compositions of this invention are useful include, but are not limited to, greenhouse films, shrink film, clarity shrink film, lamination film, extrusion coating, liners, clarity liners, overwrap film, agricultural film, high strength foam, soft foam, rigid foam, cross-linked foam, high strength foam for cushioning applications, sound insulation foam, blow molded bottles, wire and cable jacketing (including medium and high voltage cable jacketing), wire and cable insulation (especially low, medium and high voltage cable insulation), telecommunications cable jackets, optical fiber jackets, pipes, and frozen food packages. Other applications include injection molded parts (for example, automotive, consumer and industrial soft touch molded articles, slush cast moldings, etc.), extrusion thermoformed applications (for example, truck bed liners, agricultural trays, etc.), profile extruded tubes and shapes for cosmetics, and caulking, as well as acting as carriers for masterbatch concentrates of fillers, pigments and other additives. Still other applications include lubricants (including for polyvinyl chloride resins), processing aids (including for rubber compounding), mold release agents, dispersion aids, coupling agents, candles, investment castings, cable filling, paperboard coatings, curtain coatings, inks, personal care and cosmetic products, sealants, color and additive concentrates, and carpet-tape adhesives. Some of these uses are further described in U.S. Pat. No. 6,325,956. Additionally, the compositions of this invention may replace one or more of the polymers used in the compositions and structures described in U.S. Pat. Nos. 6,270,856, 5,674,613, 5,462,807, 5,246,783 and 4,508,771. The skilled artisan will appreciate other uses for these novel compositions.

The compositions of the present invention can be fabricated into articles such as fibers, films, coatings and moldings by any of the known methods in the art suitable for thermoplastic compositions. These compositions are particularly suitable for preparing fabricated articles from molding operations. Suitable molding operations for forming useful fabricated articles or parts from the compositions of this invention include various injection molding processes (for example, those described in Modern Plastics Encyclopedia/89, Mid October 1988 Issue, Volume 65, Number 11, on pp. 264-268, "Introduction to Injection Molding" and on pp. 270-271, "Injection Molding Thermoplastics"), blow molding processes (for example, that described in Modern Plastics Encyclopedia/89, Mid October 1988 Issue, Volume 65, Number 11, on pp. 217-218, "Extrusion-Blow Molding"), calendering and profile extrusion.

Some of the fabricated articles include sporting goods such as wet suits and golf grips, containers such as for food or other household articles; footwear counters, uppers and soles; automotive articles such as facia, trim and side molding; medical goods such as gloves, tubing, TV bags and artificial limbs; industrial goods such as gaskets and tool grips; personal care items such as elastic films and fibers for diapers; textiles such as nonwoven fabrics; electronic goods such as key pads and cable jacketing; and construction goods such as roofing materials and expansion joint materials.

The compositions of this invention are also useful as a compounding ingredients or additives for such uses as asphalt modifications for crack repairing and roofing, polymer processing, impact and surface modifications, sealant and adhesive formulations, oil gel viscosity modifications, and rubber extender/binder compounding.

The compositions of the present invention can also be combined with other natural or synthetic resins to improve other properties. Suitable natural or synthetic resins include, but are not limited to, rubbers, LLDPE, HDPE, LDPE, EVA, ethylene-carboxylic acid copolymers, EAA, ethylene acrylate copolymers, polybutylene, polybutadiene, polystyrene, PET, thermoplastic epoxy, nylons, polycarbonates, polyesters, polypropylene, ethylene-propylene interpolymers such as ethylene-propylene rubber, ethylene-propylene-diene monomer rubber, chlorinated polyethylene, thermoplastic vulcanates, EEA, ESI, polyurethanes, as well as graft-modified olefin polymers, and combinations of two or more of these polymers.

The invention is further illustrated by the following examples unless stated otherwise, all parts and percentages are by weight.

EXAMPLES

Inert Extenders:

The following homogeneously branched, substantially linear ethylene/1-octene copolymers were used as extenders in Examples 1-7.

Extender 1 had a density of 0.870+/−0.0025 as measured by ASTM D792 and a viscosity of 17,000 cP+/−17% @ 177° C. (350° F.) as measured by the Brookfield Viscosity Method described below.

Extender 2 had a density of 0.870+/−0.0025 as measured by ASTM D792, and a viscosity of 8,200 cP+/−17% @ 177° C. (350° F.) as measured by the Brookfield Viscosity Method described below.

Extender 3 had a density of 0.870+/−0.0025 As measured by ASTM D792, and a viscosity of 49,000 cP+/−17% @ 177° C. (350° F.) as measured by the Brookfield Viscosity Method described below.

Method used for measuring the Brookfield Viscosity of Extenders 1-6:

| Operating Parameters | |
|---|---|
| Parameter | Description |
| Instrument | Brookfield DVII+ Viscometer |
| Spindle | SC-31 |
| Sample Chamber | HT-2DB-100 Aluminum |
| Temperature | 177 C. (350 F.) |
| Torque | 50 to 70% |
| Thermosel with Heat Controller | |
| Shear Rate (rpm) | That which gives a torque value between 50 and 70% |
| Amount of sample | Sufficient to fill the sample chamber with melt to between 1 and 1.5 inches below the top of the chamber before submerging the spindle |

Viscosity readings are taken after the instrument has lined out to a stable reading.

After calibration of the instrument, fill the sample chamber with polymer (that is, extender) pieces. As the sample melts add enough to fill the chamber up to between 1 and 1.5 inches below the top of the chamber. Lower the spindle into chamber just above the level of polymer and hold there for 5 to 7 minutes after the set temperature has been reached. Lower the spindle gently into the polymer melt, until the silver guide lines up with the top of the sample chamber, then confirm that both the viscometer and the thermosel are level. Set the spindle speed to the lowest speed (0.3), then ramp the speed up slowly by no more than two increments at a time until the torque value is between 50 and 70%. Allow the instrument to line out to a stable viscosity reading.

Other Test Methods

Ultimate Tensile Strength and Energy at Break values were obtained from injection molded bars using ASTM D 638, rate of 2 inches/minute.

IZOD Impact values were obtained by, ASTM test D-256 conducted at a particular temperature, using a notched IZOD sample bar from injection molded sample bars, which were end filled.

Hardness shore "A" or "D" was measured in accordance with ASTM D-2240.

Dynamic mechanical spectroscopy (DMS, melt) was measured on a Rheometrics ARES with 25 mm parallel plates from 0.1-100 rad/s at 230° C. Solid state DMS measurements were made on the same instrument in a torsion mode from −100 to 200° C. at 1 rad/s with a step size of 5° C.

Capillary rheology data were measured on a Goettfert Rheograph 2003 at 230° C. from 100-6,000 s-1.

Differential Scanning Calorimetry (DSC) were measured using a TA Instruments Q1000 by heating to 230° C. and holding for 3 minutes, cooling at 10° C./min to −40° C. and holding for 3 minutes, and then heating at 10° C./min to 230° C. (second heat, reported).

Flexural Modulus was measured in accordance with ASTM D-790.

Example 1

This example demonstrates the enhanced impact resistance that results from blending Extender 1 with an EAA copolymer.

Table 1 reports the improvement in the low temperature impact properties of Primacor* 5990I (an ethylene/acrylic acid copolymer, 20 wt % acrylic acid, 1300 g/10 min I2 (190 C)) and/or Primacor* 5980I (an ethylene/acrylic acid copolymer, 20 wt % acrylic acid, 300 g/10 min I2 (190 C)) and both registered trademarks of and manufactured by The Dow Chemical Company) when blended with Extenders 1 and 3 at various weight concentrations. The blends were compression molded into plaques, samples were cut from the plaques, and the samples were subjected to Izod impact tests at 25 C and −20 C temperature. Table 1 reports the improvement in Izod impact for the Primacor resin with increasing amounts of Extender 1 (17.1 J/m to 45.0 J/m with a 20 wt % addition of Extender 1), each of these improvement occuring with little change in the Melt Flow Rate, (by the term "Melt Flow Rate." for Example 1 is meant melt index, I2 in g/10 min measured using ASTM D-1238, Condition 125° C./2.16 kg).

TABLE 1

PRIMACOR/Extender Blends of Example 1

| Example # | Composition | Melt Flow Rate @ 125° C. | Avg Izod RT (J/m) | Avg Izod −20 deg C. {J/m} |
|---|---|---|---|---|
| Comp Ex 1A | PRIMACOR 5990I | 61.2 | 424.5 | 17.1 |
| Comp Ex 1B | PRIMACOR 5980I | 14.4 | 547.0 | 17.4 |
| Ex 1A | 90 wt % PRIMACOR 5990I + 10 wt % Extender 1 | 62.4 | 416.8 | 30.9 |
| Ex 1B | 80 wt % PRIMACOR 5990I + 20 wt % Extender 1 | 66.9 | 291.5 | 45.0 |
| Ex 1C | 40 wt % PRIMACOR 5990I + 30 wt % PRIMACOR 5980I + 30 wt % Extender 1 | 41.2 | 231.0 | 45.3 |

TABLE 1-continued

PRIMACOR/Extender Blends of Example 1

| Example # | Composition | Melt Flow Rate @ 125° C. | Avg Izod RT (J/m) | Avg Izod −20 deg C. {J/m} |
|---|---|---|---|---|
| Ex 1D | 30 wt % PRIMACOR 5990I + 30 wt % PRIMACOR 5980I + 40 wt % Extender 1 | 52.7 | 232.2 | 27.2 |
| Ex 1E | 40 wt % PRIMACOR 5990I + 30 wt % PRIMACOR 5980I + 30 wt % Extender 3 | 32.2 | 258.7 | 46.6 |
| Ex 1F | 30 wt % PRIMACOR 5990I + 30 wt % PRIMACOR 5980I + 40 wt % Extender 3 | 10.7 | 234.9 | 36.9 |

Example 2

This example demonstrates the benefits of using ethylene polymer/low viscosity inert extender blends for injection molding applications, where the soft feel of objects is required, such as gasket and overmold applications, (by the term "I2." for Example 2 is meant melt index, I2 in g/10 min measured using ASTM D-1238, Condition 190° C./2.16 kg, by the term "I21." for Example 2 is meant melt index, I21 in g/10 min measured using ASTM D-1238, Condition 190° C./21.6 kg).

The Extenders 1 and 2 were blended with FLEXOMER™ DFDB-9042 (an ethylene copolymer having a density of 0.903 g/cc and I2 of 4.6 g/10 min and a product and trademark of Union Carbide Corporation, a Subsidiary of The Dow Chemical Company) and FLEXOMER™ DFDB-1085 (an ethylene copolymer having a density of 0.884 g/cc and I2 of 0.8 g/10 min and a product and trademark of Union Carbide Corporation, a Subsidiary of The Dow Chemical Company).

Melt Compounding

Melt-compounding of ethylene polymer and Extender was conducted using either a Brabender batch mixer or Berstoff twin-screw extruder. Inadequate mixing and gel issues were not observed with any of the blends.

Blend Compatibility:

Differential scanning calorimetry (DSC) measurements were conducted on DFDB 9042/Extender 1, DFDB 9042/Extender 2 and DFDB 1085/Extender 2 blends. Comparing the second heat profiles of the blends with those of the individual blend components, the blends do not show any additional melting peaks/phases. The ethylene polymer and low viscosity extender are very compatible with each other.

Physical Properties:

Certain physical properties of plaques made from the blends are reported in Tables 2-1 through 2-3. As expected, tensile properties (strength and elongation) decrease as the Extender content increases. Hardness (Shore A and Shore D) does not show dramatic reduction with increased Extender levels within the blends.

Figure 2:
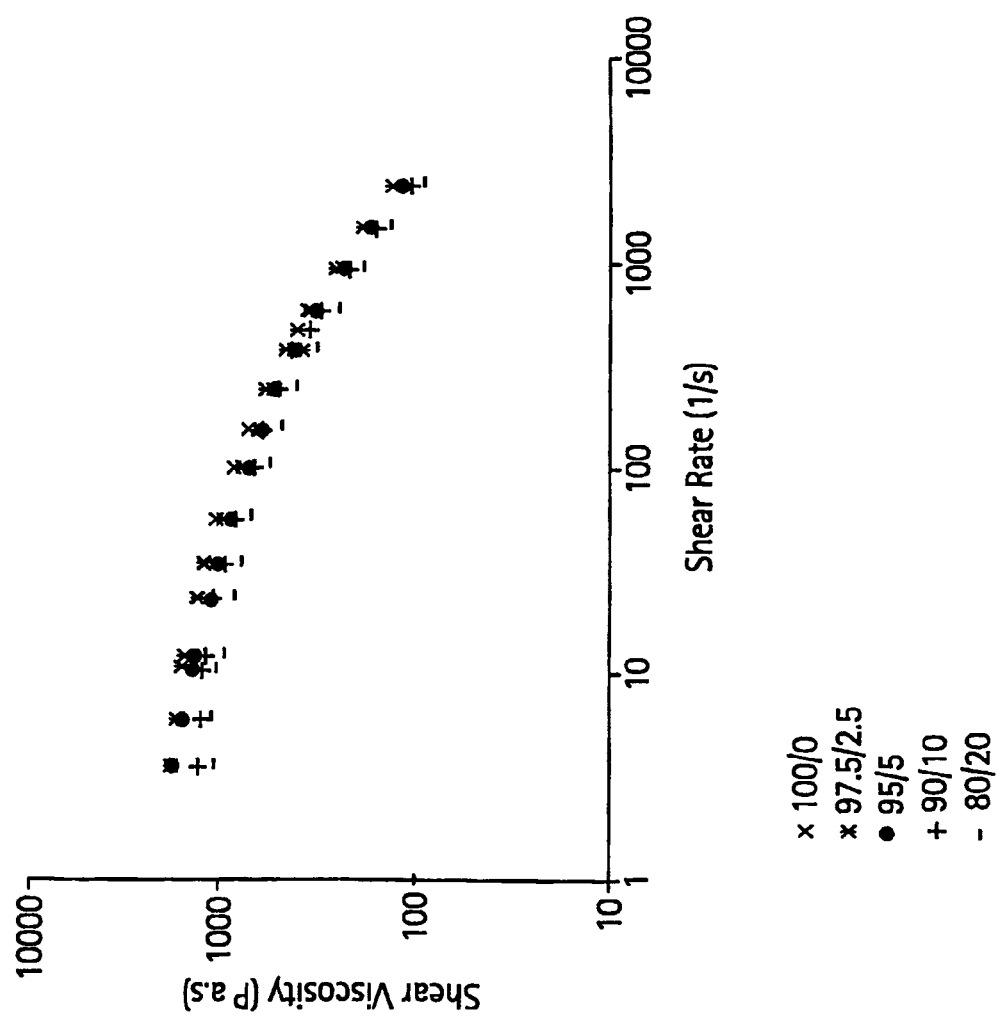
FIG. 2 is a graph reporting the shear viscosity versus shear rate of a second thermoplastic composition of this invention.
Figure 3:
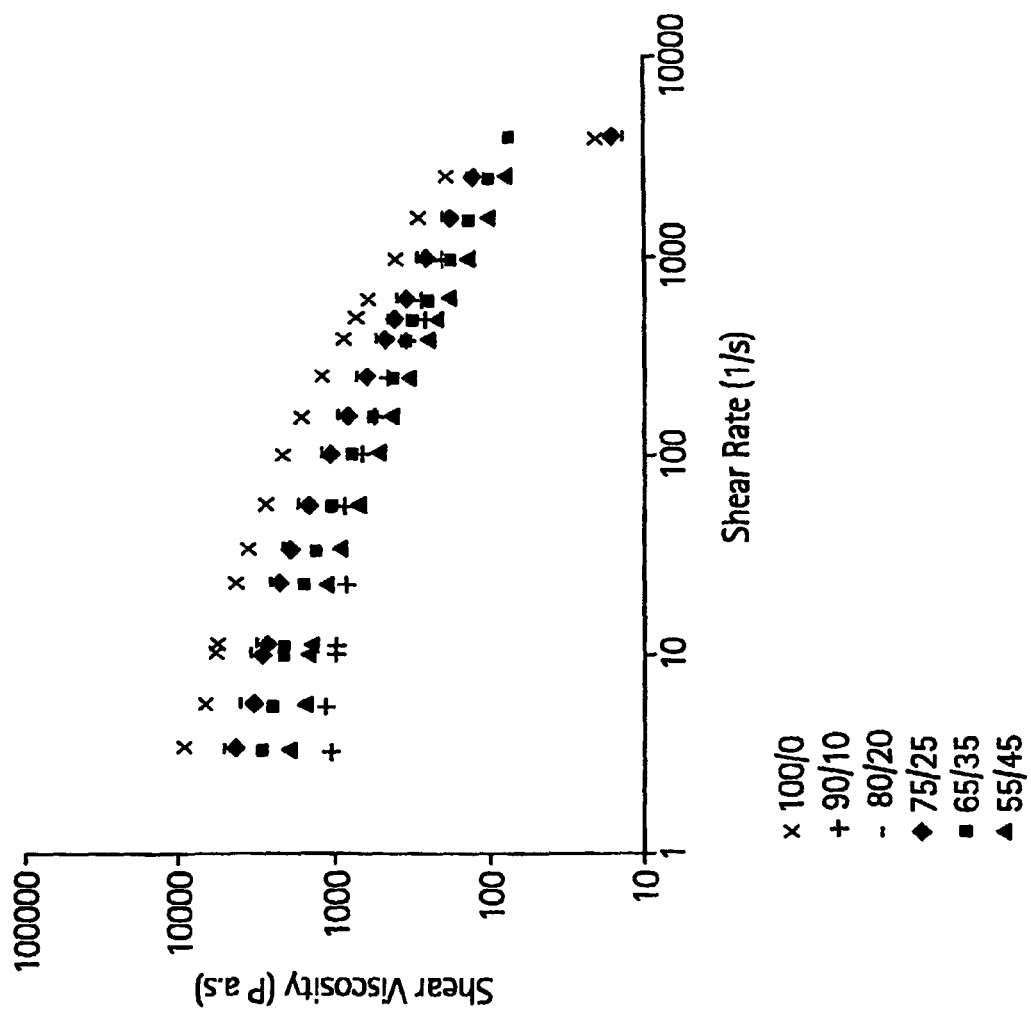
FIG. 3 is a graph reporting the shear viscosity versus shear rate of a third thermoplastic composition of this invention.

Capillary Rheology:

Capillary rheology data of the blends are shown in the FIGS. 1-3. The presence of the Extender component reduces shear viscosity, and thus improves processability.

TABLE 2-1

DFDB9042/Extender 1 Blends of Example 2

| Blend # | Comp Ex 2A | Ex 2A | Ex 2B | Ex 2C | Ex 2D | Comp Ex 2B |
|---|---|---|---|---|---|---|
| DFDB 9042 (wt percent) | 100 | 97.5 | 95 | 90 | 80 | 0 |
| Extender 1 (wt percent) | 0 | 2.5 | 5 | 10 | 20 | 100 |

TABLE 2-1-continued

DFDB9042/Extender 1 Blends of Example 2

| Blend # | Comp Ex 2A | Ex 2A | Ex 2B | Ex 2C | Ex 2D | Comp Ex 2B |
|---|---|---|---|---|---|---|
| Physical Properties | | | | | | |
| Melt Index, I2 (g/10 min) | 4.6 | 5.0 | 5.4 | 6.6 | 8.7 | |
| Flow Index, I21, (g/10 min) | 131 | 142 | 158 | 208 | 294 | |
| MFR | 28 | 28.5 | 29.4 | 31.5 | 33.9 | |
| Density (g/cm3) | 0.9033 | 0.9025 | 0.9016 | 0.9006 | 0.8975 | |
| Tensile Yield Stress (psi) | 840 | 800 | 780 | 760 | 670 | 180 |
| Tensile Yield Elongation (percent) | 34 | 38 | 47 | 44 | 40 | 39 |
| Tensile Break Stress (psi) | 1460 | 1570 | 1460 | 1410 | 1000 | 200 |
| Tensile Break Elongation (percent) | 825 | 925 | 910 | 920 | 790 | 99 |
| Shore A | 88 | 93 | 92 | 92 | 89 | 56 |
| Shore D | 31 | 28 | 29 | 27 | 24 | 7 |
| DSC Analysis $2^{nd}$ Heating | | | | | | |
| Melt Pt (° C.) | 121 | 119 | 120 | 120 | 119 | 70 |
| Heat of Melt (cal/g) | 20.3 | 19.3 | 17.1 | 17.3 | 17.5 | 8 |
| DSC Analysis Crystallization | | | | | | |
| Crystallization Peak (° C.) | 102 | 106 | 106 | 106 | 106 | 53 |
| Heat of Fusion (cal/g) | 19.4 | 19.3 | 16.9 | 17.3 | 16.4 | 11.7 |

TABLE 2-2

DFDB9042/Extender 2 Blends of Example 2

| Blend # | Comp Ex 2C | Ex 2E | Ex 2F | Ex 2G | Ex 2H | Comp Ex 2D |
|---|---|---|---|---|---|---|
| DFDB 9042 (wt percent) | 100 | 97.5 | 95 | 90 | 80 | 0 |
| Extender 2 (wt percent) | 0 | 2.5 | 5 | 10 | 20 | 100 |
| Physical Properties | | | | | | |
| Melt Index, I2 (g/10 min) | 4.6 | 5.0 | 5.4 | 6.7 | 9.5 | |
| Flow Index, I21, (g/10 min) | 131 | 145 | 155 | 211 | 338 | |
| MFR | 28 | 29 | 28 | 32 | 36 | |
| Density (g/cm3) | 0.9033 | 0.9033 | 0.9020 | 0.9009 | 0.8986 | |
| Tensile Yield Stress (psi) | 840 | 820 | 770 | 780 | 690 | 210 |
| Tensile Yield Elongation (percent) | 34 | 44 | 45 | 43 | 42 | 23 |
| Tensile Break Stress (psi) | 1460 | 1480 | 1470 | 1300 | 980 | 230 |
| Tensile Break Elongation (percent) | 825 | 840 | 930 | 830 | 750 | 49 |
| Shore A | 88 | 93 | 89 | 91 | 90 | 55 |
| Shore D | 31 | 29 | 27 | 27 | 22 | 8 |
| DSC Analysis $2^{nd}$ Heating | | | | | | |
| Melt Pt (° C.) | 121 | 120 | 119 | 119 | 119 | 76 |
| Heat of Melt (cal/g) | 20.3 | 22 | 20.2 | 19.3 | 17.2 | 8.8 |
| DSC Analysis Crystallization | | | | | | |
| Crystallization Peak (° C.) | 102 | 107 | 106 | 106 | 106 | 58 |
| Heat of Fusion (cal/g) | 19.4 | 20.7 | 19.2 | 19.1 | 17.5 | 9.2 |

TABLE 2-3

DFDB 1085/Extender 2 Blends of Example 2

| Blend # | Comp Ex 2E | Ex 2I | Ex 2J | Ex 2K | Ex 2L | Comp Ex 2F |
|---|---|---|---|---|---|---|
| DFDB 1085 (wt percent) | 100 | 90 | 80 | 75 | 65 | 55 |
| Extender 2 (wt percent) | 0 | 10 | 20 | 25 | 35 | 45 |
| Physical Properties | | | | | | |
| Melt Index, I2 (g/10 min) | 0.8 | 1.1 | 1.4 | 2.0 | 3.3 | 5.7 |
| Flow Index, I21, (g/10 min) | | 43 | 60 | 96 | 184 | 360 |
| MFR | | 39 | 43 | 48 | 56 | 63 |
| Density (g/cm3) | 0.8800 | 0.8870 | 0.8861 | 0.8854 | 0.8846 | 0.8840 |
| Tensile Yield Stress (psi) | 840 | 1340 | 1260 | 1100 | 710 | 600 |
| Tensile Yield Elongation (percent) | | 900 | 960 | 930 | 810 | 870 |
| Tensile Break Stress (psi) | 1470 | 1330 | 1250 | 1100 | 710 | 600 |
| Tensile Break Elongation (percent) | | 900 | 930 | 925 | 810 | 900 |

TABLE 2-3-continued

DFDB 1085/Extender 2 Blends of Example 2

| Blend # | Comp Ex 2E | Ex 2I | Ex 2J | Ex 2K | Ex 2L | Comp Ex 2F |
|---|---|---|---|---|---|---|
| Shore A | 80 | 77 | 75 | 75 | 73 | 73 |
| Shore D | 21 | 16 | 15 | 15 | 14 | 14 |
| DSG Analysis 2$^{nd}$ Heating | | | | | | |
| High Melt Pt (° C.) | | 118 | 118 | 118 | 117 | 117 |
| Low Melt Pt (° C.) | | 91 | 81 | 78 | 73 | 76 |
| Heat of Melt (cal/g) | | 10.2 | 10.1 | 9.2 | 11.2 | 9.7 |
| DSC Analysis Crystallization | | | | | | |
| 1st Crystallization Peak (° C.) | | 102 | 101 | 101 | 100 | 100 |
| 2nd Crystallization Peak (° C.) | | | 65 | 65 | 65 | 65 |
| Heat of Fusion (cal/g) | | 9.2 | 9.8 | 8.4 | 10.3 | 9.5 |

Example 3

Four blends of a poly hydroxyamino ether epoxy resin, BLOX* (a product and trademark of The Dow Chemical Company) (PHAE-) and Extender 3 (a low viscosity, homogeneously branched, substantially linear ethylene/1-octene copolymer of 0.880 g/cc density, 1000 g/10 min melt index (I2) and 8200 cP Brookfield viscosity at 350° F.) were prepared by blending the two resins first using a Haake blender followed by extrusion into test specimens. These blends were subjected to stress-strain and Izod Impact testing. The blend compositions and results are reported in Table 3. By the term "I2." for Example 3 is meant melt index, I2 in g/10 min measured using ASTM D-1238, Condition 190° C./2.16 kg

TABLE 3

PHAE/Extender 3 Blends of Example 3

| Blend No. | Comp Ex 3A | Ex 3A | Ex 3B | Ex 3C | Ex 3D | Comp Ex 3B |
|---|---|---|---|---|---|---|
| PHAE (wt percent) | 100 | 95 | 90 | 80 | 20 | 0 |
| Extender 3 (wt percent) | | 5 | 10 | 20 | 80 | 100 |
| Mechanical Properties | | | | | | |
| Break Stress, (kpsi) | 6.76 | 5.12 | 2.48 | 1.77 | 0.31 | 0.29 |
| % Strain @ Break | 13.4 | 4.7 | 3.3 | 2.6 | 32.1 | 55 |
| Flexural Modulus, (kpsi) | 331.8 | 307.1 | 261.3 | | | |
| Izod Impact @ −20° C. (Ft-lb/in) | 0.291 | 0.522 | 0.318 | | | |
| Izod Impact @ −20° C. (J/m) | 15.56 | 27.88 | 16.97 | | | |
| Izod Impact @ RT (Ft-lb/in) | 0.424 | 1.165 | 0.891 | | | |
| Izod Impact @ RT (J/m) | 22.63 | 62.17 | 47.54 | | | |

The peak stress and strain at break decreased as the extender level was increased from 0 wt % to up to 20 wt %. More precisely, strain at break drops off most dramatically with the first 5 wt % addition of the extender while break stress drops off much more gradually. The complex viscosity shows very little variation as the extender level is increased from 0 wt % to 20 wt %, except the complex viscosity value dips a little at the 5 wt % and 10 wt % levels before increasing again at the 20 wt % level of extender. As in the case of break stress, flexural modulus decreases gradually as the extender level is increased. The Izod Impact data show an unexpected improvement in that, for both room temperature (25 C) and low temperature (−20 C), the extender causes the Izod Impact to peak at 5 wt % level of extender.

Figure 4:
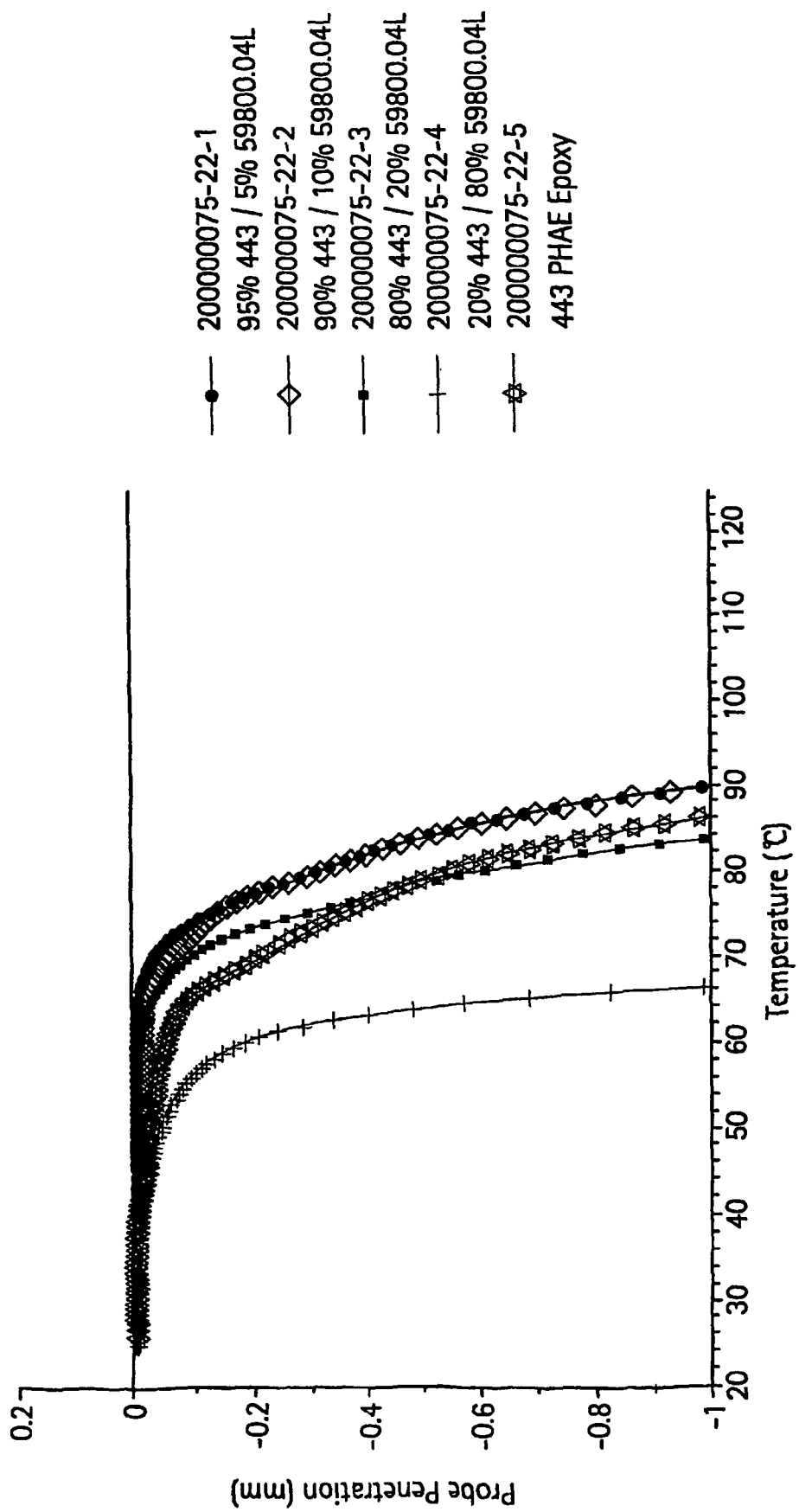
FIG. 4 is a graph reporting the probe penetration versus temperature of a sample plaque made from a thermoplastic composition of this invention.

TMA vs. temperature data are shown in FIG. 4. Addition of 5, 10, and 20 wt % extender increases the thermal stability and hardness of the thermoplastic epoxy as shown by an increase of the temperature of onset of penetration of 5-10 C.

Figure 5:
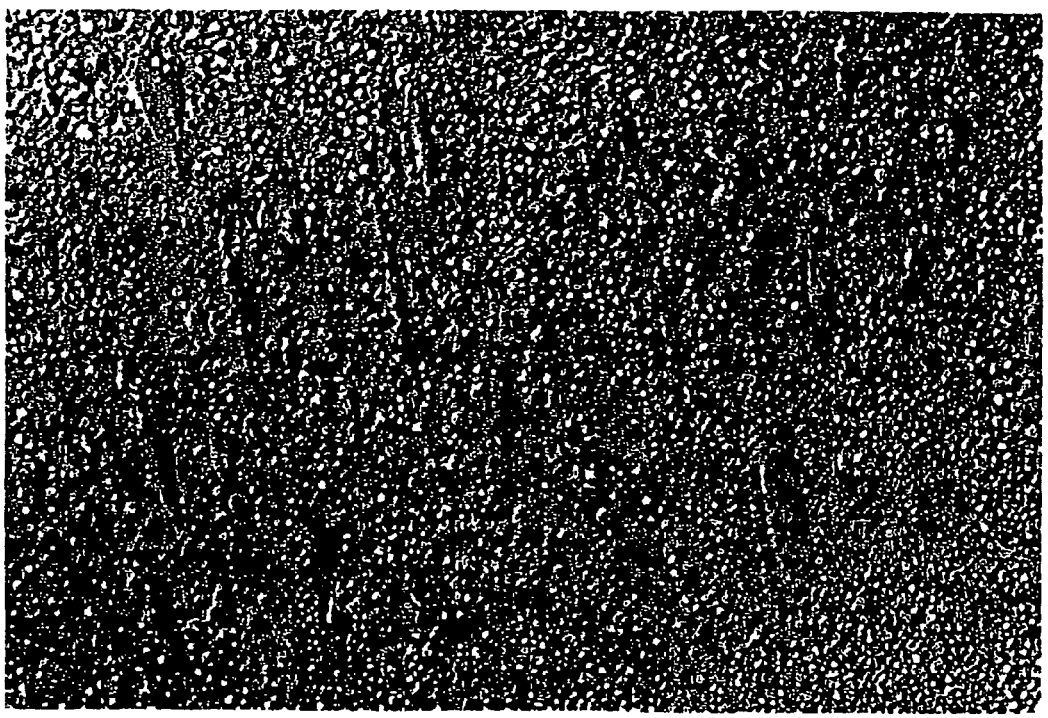
FIG. 5 is an optical micrograph of a thermoplastic composition of this invention.

Finally FIG. 5 (an optical micrograph of a 90/10 blend of PHAE/Extender 3) shows that extender domains are well dispersed. The domains in this micrograph are elongated and oriented, but the nature of dispersion will vary with the blend. The size of the extender domains vary, and in FIG. 5 the sizes range from fractional microns to 15 microns.

Example 4

Kraton™ 1651 (a product and registered trademark of Shell Chemical Company), a high molecular weight styrene/ethylene/butylene/styrene block copolymer ("SEBS") was blended with Extender 1 (a low viscosity, homogeneously branched, substantially linear ethylene/1-octene copolymer of 0.87 g/cc density, 500 g/10 min I2 and Brookfield viscosity of 17,000 cP at 350 F) at a 85:15 relative wt % ratio, and the blend was subjected to various tests. By the term "I2." for Example 4 is meant melt index, I2 in g/10 min measured using ASTM D-1238, Condition 190° C./2.16 kg.

Figure 6:
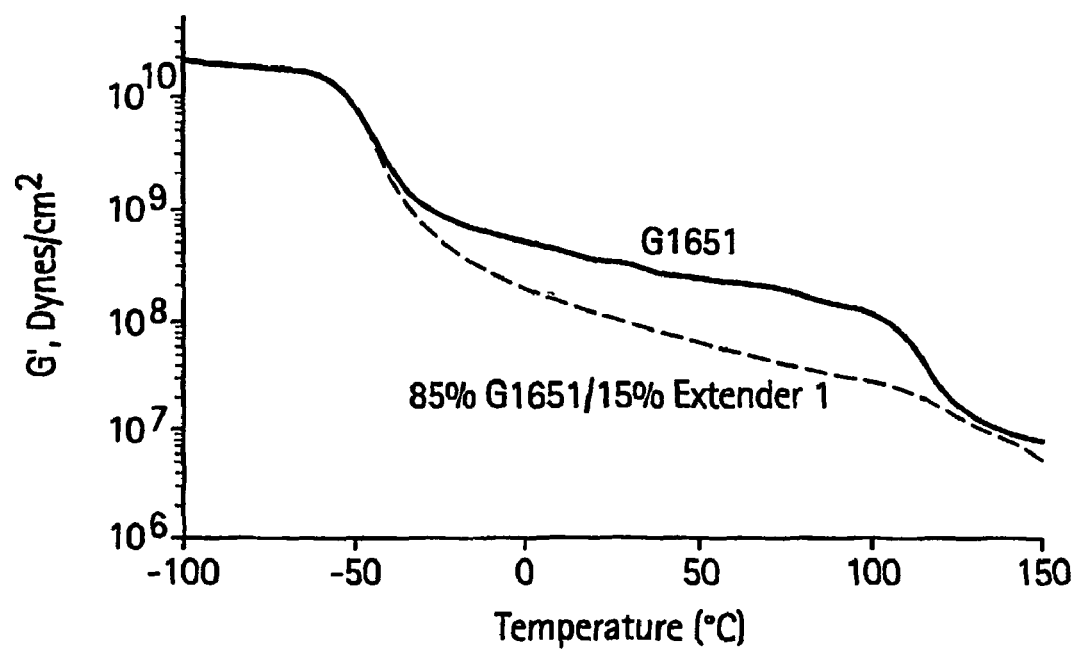
FIG. 6 is a graph reporting the modulus versus temperature of a styrene block copolymer and the copolymer in combination with an inert extender of this invention.
Figure 7:
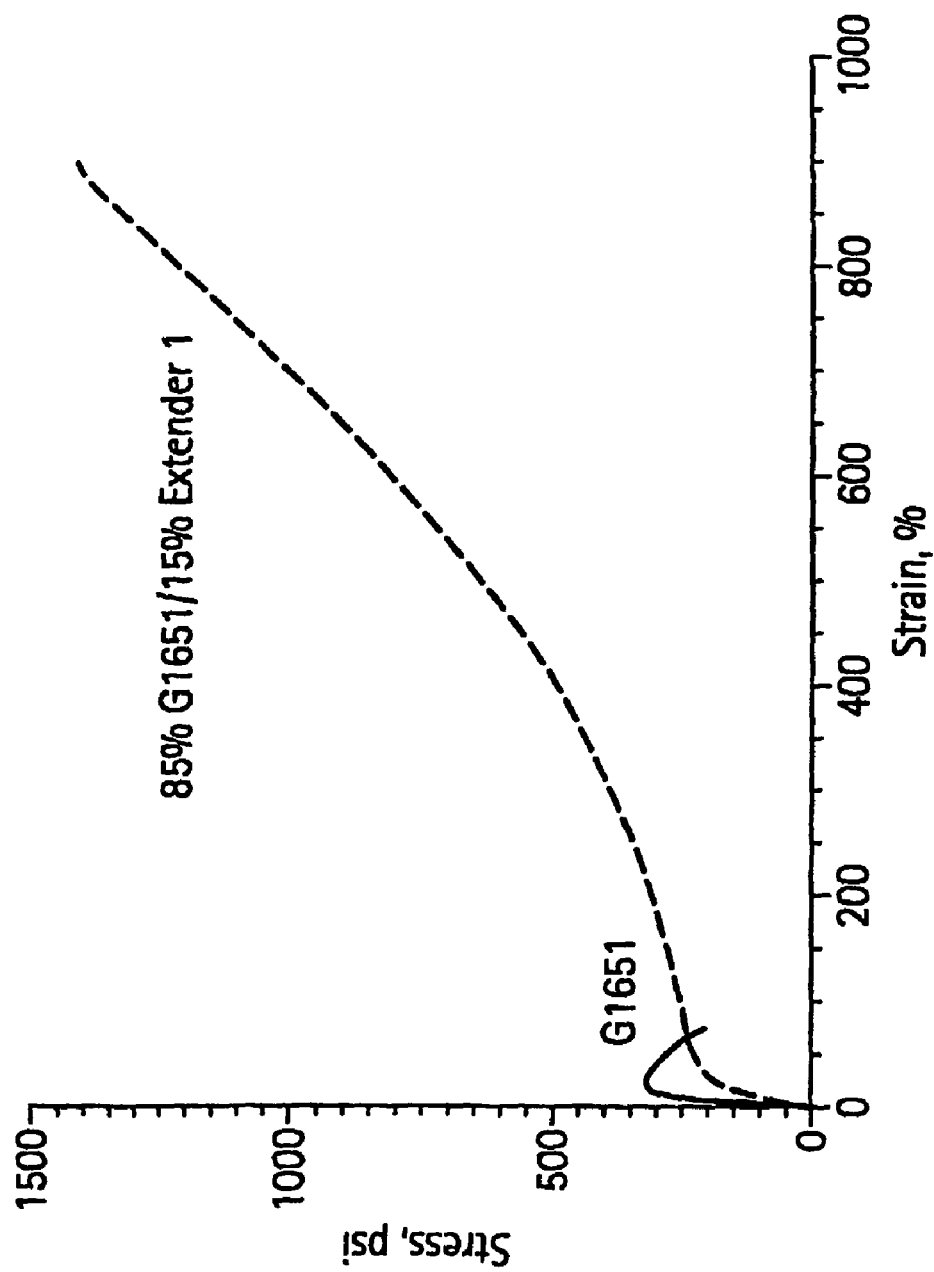
FIG. 7 is a graph reporting the stress versus strain behavior of a styrene block copolymer and the copolymer in combination with an inert extender of this invention.
Figure 8:
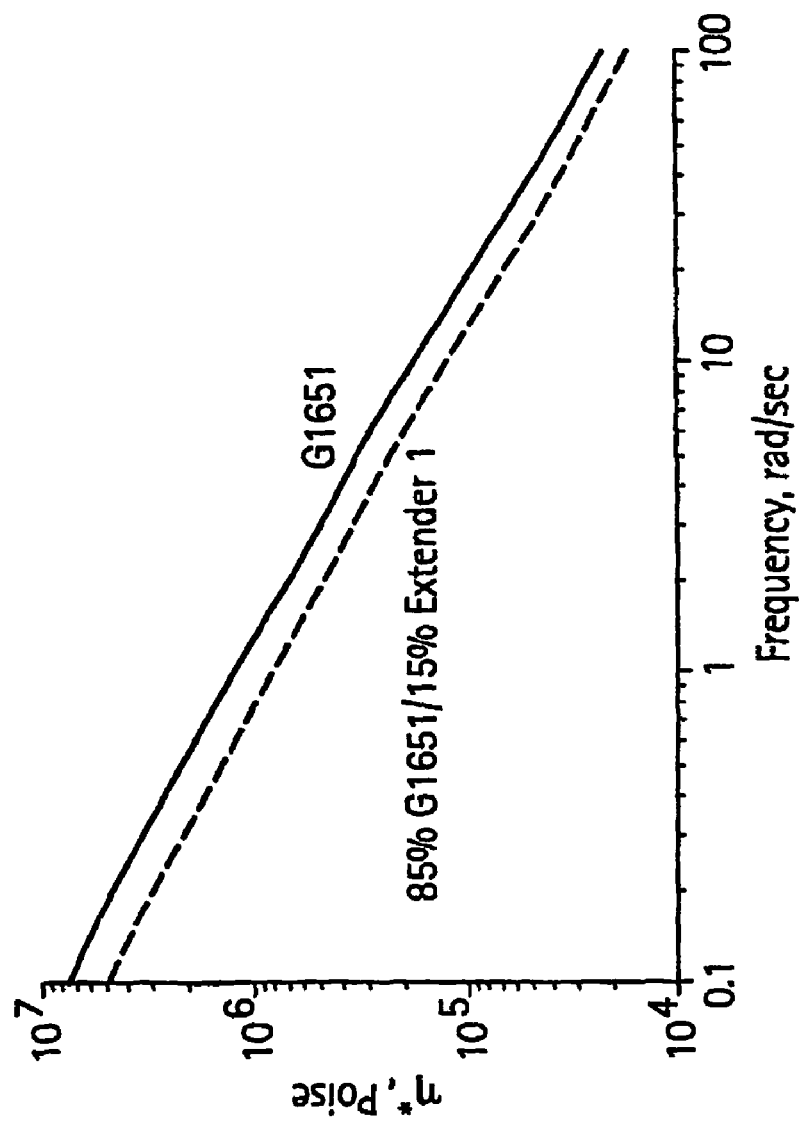
FIG. 8 is a graph reporting the melt flow property of a styrene block copolymer and the copolymer in combination with an inert extender of this invention.

Table 4 reports various physical properties of the blend versus unblended Kraton™ 1651. The blend demonstrates increased elongation, tensile strength and flexibility over the neat Kraton™ 1651. FIG. 6 also shows the enhanced flexibility, and the compatibility/miscibility of the two components of the blend. FIG. 7 shows the significant increase in tensile strength that results from the relatively small addition of the extender. Finally, FIG. 8 shows that the addition of the extender to Kraton™ 1651 lowers the melt viscosity of the block copolymer which, in turn, enhances its processability, that is, it results in one or more of a lower extrusion temperature, higher throughput and elimination of melt fracture.

TABLE 4

Tensile Property of SEBS/Extender Blends

| Ex # | Sample | Elongation at break, (%) | Stress @ break, (psi) | Energy @ break, (in-lb) |
|---|---|---|---|---|
| Comp Ex 4A | 100 wt % SEBS | 55 | 240 | 2.4 |
| Ex 4A | 85 wt % SEBS/15 wt % Extender1 | 820 | 1160 | 79 |

Example 5

Figure 9:
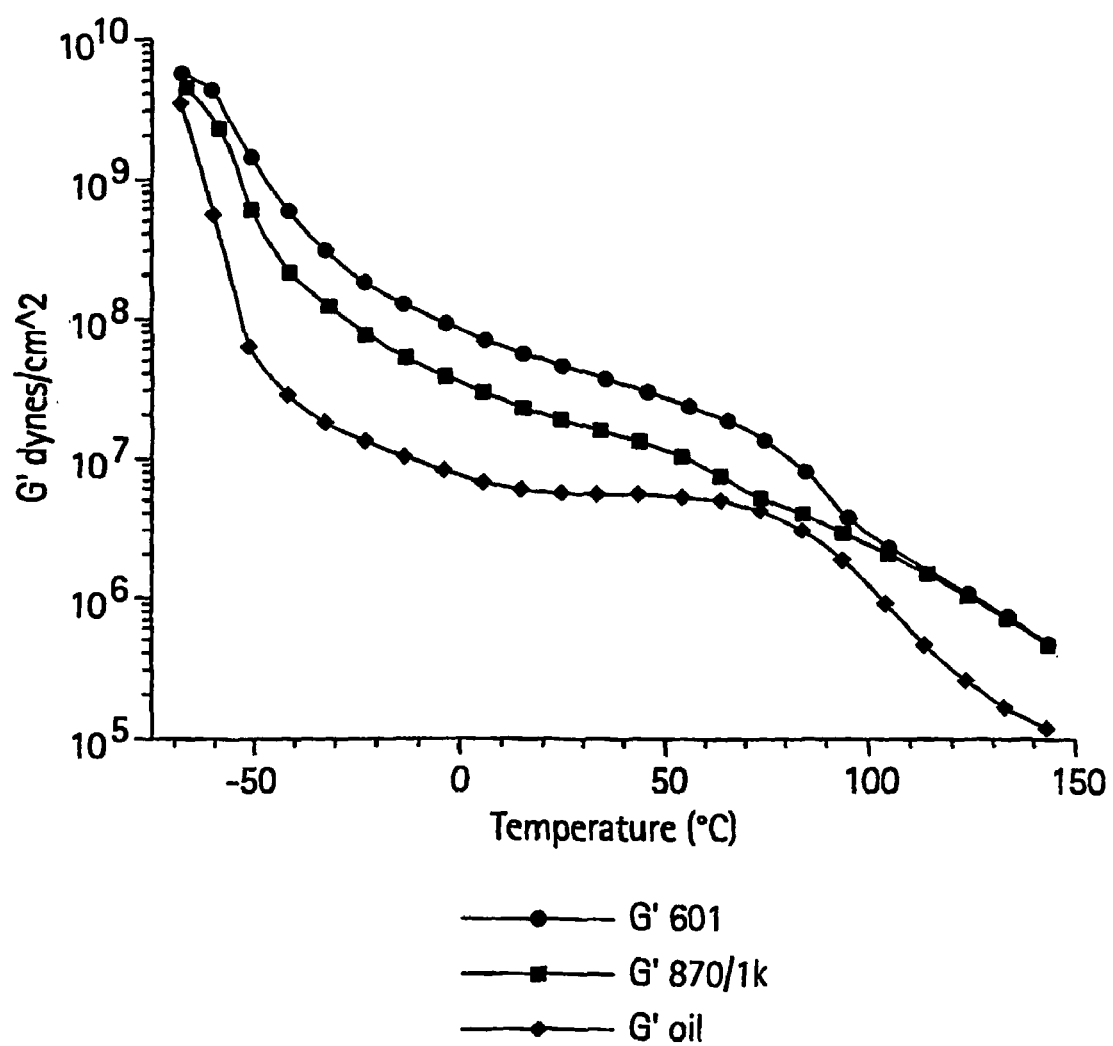
FIG. 9 is a Dynamic Mechanical Spectroscopic diagram reporting a decrease in G' values of a styrene block copolymer in combination with various extenders.

Dynamic Mechanical Spectroscopy data (FIG. 9) shows that Extender 2, when blended into Kraton™ 1652 (a product and registered trademark of Shell Chemical Company) at a concentration of 33 weight percent (see line labeled "G' 870/1k" in FIG. 9) allows a decrease in G' values of approximately half an order of magnitude compared to Petrothene™ NA 601 (a registered trademark and product of Equistar Chemical Company) at the same concentration (see line labeled "G' 601" in FIG. 9). The G' values for the Extender 2 blend are also closer to that of a blend of 33 weight percent oil and 67 weight percent Kraton™ 1652 (see line labeled "G' oil" in FIG. 9). Lower G' translates into a softer feel for the elastomer. The low density, low viscosity extender gives a softer, more processable elastomer than Petrothene™ NA 601 with improved preservation of tensile strength and modulus relative to oil filled Kraton™ blend. The tensile properties are summarized in Table 5.

TABLE 5

Tensile Property of KRATON ™/Extender Blends

| Ex # | Sample | 100% Mod (psi) | 200% Mod (psi) | Tensile (psi) | Elongation (%) | Toughness (psi) |
|---|---|---|---|---|---|---|
| Comp Ex 5A | Kraton ™ G 1652 | 676 | 917 | 9400 | 870 | 28160 |
| Comp Ex 5B | 67 wt % Kraton ™ G 1652 + 33% TUFLO ™ oil* | 285 | 402 | 2140 | 1020 | 10630 |
| Ex 5A | 67 wt % Kraton ™ G 1652 + 33% Extender 2 | 451 | 581 | 2980 | 900 | 11930 |
| Comp Ex 5C | 67 wt % Kraton ™ G 1652 + 33% Petrothene ™ NA 601.04 | 587 | 766 | 4500 | 870 | 16640 |

*A product and trademark of Arco

Example 6

For Example 6, Extenders 1-3 were added to a TPO formulation prepared from a polypropylene homopolymer having a density of 0.89 g/cm$^3$ and a melt flow index of 35 grams/10 minutes at 230° C., to which was added varying amounts of an elastomer, EL1, (which was an ethylene/1-octene copolymer having a density of 0.870 cm$^3$ and a nominal melt index of 5.0 grams/10 minutes at 190° C., is purchased commercially from Du Pont Dow Elastomers as ENGAGE™ 8200) and Extenders 1-3. Unless stated otherwise, by the term "I2." for Example 6 is meant melt index, I2 in g/10 min measured using ASTM D-1238, Condition 190° C./2.16 kg.)

The blend compositions are summarized in Table 6 and the results of the evaluations are shown in Table 7:

TABLE 6

Compositions of TPO/Extender Blends of Example 6

| Ex # | Total Blend I2* (g/10 min) | PP C700-35N (wt % in total blend) | Total Elastomer + Extender (wt % in total blend) | EL1 (wt % in Elastomer + Extender) | Extender # | Extender (wt % in Elastomer + Extender) |
|---|---|---|---|---|---|---|
| 6A | 27.90 | 70.0 | 30.0 | 20.4% | 1 | 9.6 |
| 6B | 26.46 | 77.5 | 22.5 | 18.5% | 2 | 4.1 |
| 6C | 29.51 | 77.5 | 22.5 | 16.9% | 3 | 5.6 |
| 6D | 27.47 | 77.5 | 22.5 | 16.9% | 1 | 5.6 |
| 6E | 27.93 | 70.0 | 30.0 | 22.5% | 3 | 7.5 |
| 6F | 27.45 | 77.5 | 22.5 | 18.5% | 3 | 4.1 |
| 6G | 27.75 | 77.5 | 22.5 | 18.5% | 1 | 4.1 |
| 6H | 27.54 | 77.7 | 22.5 | 15.3% | 1 | 7.2 |
| 6I | 28.3 | 77.5 | 22.5 | 15.3% | 2 | 7.2 |
| 6J | 27.79 | 70.0 | 30.0 | 24.6% | 2 | 5.4 |
| Comp Ex 6 | 24.18 | 70.0 | 30.0 | 30.0% | NA | NA |

TABLE 7

Propertes of TPO/Extender Blends

| Ex # | Ult. Tensile (psi) | Ult. Tensile (MPa) | Ult. Elong (%) | Energy to Break (in-lb) | Energy to Break (J) | 1% Sec | 1% Sec Modulus (Mpa) | 2% Sec | 2% Sec Modulus (MPa) | RT IZOD (ft-lb) | RT IZOD (J/m) | 60 Deg Gloss |
|---|---|---|---|---|---|---|---|---|---|---|---|---|
| 6A | 1758 | 12.1 | 163.1 | 202 | 22.8 | 130 | 896 | 115 | 791 | 8.975 | 479 | 67.4 |
| 6B | 2009 | 13.8 | 159.7 | 217 | 24.5 | 153 | 1053 | 137 | 941 | 2.309 | 123 | 86.5 |
| 6C | 2018 | 13.9 | 168.7 | 235 | 26.6 | 154 | 1062 | 136 | 938 | 1.506 | 80 | 89 |
| 6D | 2045 | 14.1 | 120.1 | 171 | 19.3 | 151 | 1040 | 136 | 937 | 2.254 | 120 | 87.7 |
| 6E | 2004 | 13.8 | 294.4 | 363 | 41.0 | 153 | 1052 | 135 | 928 | 9.813 | 524 | 84.6 |
| 6F | 2016 | 13.9 | 162.6 | 226 | 25.5 | 145 | 1001 | 130 | 898 | 2.142 | 114 | 81.2 |
| 6G | 2115 | 14.6 | 199.7 | 272 | 30.8 | 132 | 909 | 118 | 813 | 2.986 | 159 | 86.4 |
| 6H | 1950 | 13.4 | 136.8 | 189 | 21.3 | 154 | 1059 | 134 | 926 | 3.076 | 164 | 88 |
| 6I | 2039 | 14.1 | 157.9 | 221 | 25.0 | 137 | 945 | 120 | 829 | 1.756 | 94 | 86.4 |
| 6J | 1907 | 13.1 | 223.3 | 275 | 31.1 | 134 | 924 | 117 | 808 | 9.892 | 528 | 88.7 |
| Comp Ex 6 | 2090 | 14.4 | 477.7 | 596 | 67.3 | 135 | 933 | 119 | 818 | 10.8 | 577 | 95.9 |

Analysis of the data in Tables 6 and 7 demonstrate that the addition of Extender to the elastomer component of a thermoplastic polyolefin, results in improved impact properties while also allow for a lowering in compound in viscosity.

Example 7

A series of blends of engineering thermoplastic resins such as PET, nylon-6,6 and polycarbonate with Extender 2 were made using a Haake bowl mixer, Rheomix 600, of 69 ml. capacity. The PET was grade C88 obtainable from The Dow Chemical Company, and the Polycarbonate was CALIBRE™ 200-3 (a product and registered trademark of The Dow, Chemical Company). The blends were made with the bowl preheated to 270° C. with a rotor speed of 50 rpm. The engineering thermoplastics were placed in a vacuum oven at 140° C. for 2 days prior to use to dry the resins of any moisture. A slight nitrogen sweep was used to assist in moisture removal. The blends were made by first adding the engineering thermoplastics to the preheated rotating bowl followed quickly by the Extender. The ram was then lowered to seal the bowl, while melt blending occurred, which was allowed to continue for eight minutes following initial resin addition. The temperature, rotor speed, and melt torque was graphically monitored. After initial melting all blends exhibited zero torque. After eight minutes of mixing the rotors were stopped, the bowl was disassembled, and the polymer blend was removed and flattened. The nylon blends became rigid more quickly and were difficult to flatten. Table 8 shows the composition of three blends and Table 9 the corresponding blend properties.

TABLE 8

Compositions of Engineering Thermoplastic/Extender Blends of Example 7

| Ex # | Component A (wt %) | Component B (wt %) |
|---|---|---|
| Ex 7A | PET (85) | Extender 2 (15) |
| Ex 7B | Nylon 6,6 (85) | Extender 2 (15) |
| Ex 7C | Polycarbonate (85) | Extender 2 (15) |
| Comp Ex 7A | PET (100) | N/A |
| Comp Ex 7B | Nylon 6,6 (100) | N/A |
| Comp Ex 7C | Polycarbonate (100) | N/A |

TABLE 9

Properties of Engineering Thermoplastic/Extender Blends of Example 7

| Ex # | Cross head Speed in/min | Temp ° C. | Break Strength (psi) | Yield Strength (psi) | Elongation to Break (%) | Young's Modulus (psi) | Energy to Break (inch-lbs) |
|---|---|---|---|---|---|---|---|
| Ex 7A | 0.5 | 20.0 | 2467 | 2467 | 1.5 | 178092 | 0.23 |
| Ex 7B | 0.5 | 20.6 | 1507 | 1934 | 2.4 | 168831 | 0.33 |
| Ex 7C | 0.5 | 20.7 | 4456 | 4781 | 7.2 | 158343 | 3.09 |
| Comp Ex 7A | 0.5 | 20.1 | 4185 | 7630 | 94 | 225038 | 43.55 |
| Comp Ex 7B | 0.5 | 20.0 | 7807 | 8016 | 75 | 208537 | 62.09 |
| Comp Ex 7C | 0.5 | 20.1 | 8845 | 9543 | 17 | 267257 | 14.95 |

Although the invention has been described in considerable detail through the examples, this detail is for the purpose of illustration. Many variations and modifications can be made without departing from the spirit and scope of the invention as described in the appended claims

What is claimed is:

1. A thermoplastic blend composition consisting of:
   A) from 75 to 99 weight percent, based on the total weight of the thermoplastic blend composition, of a thermoplastic polyolefin composition, which consists of the following:
      (a) from 50 to 83.5 weight percent of polypropylene, HDPE, or a mixture thereof; and
      (b) from 16.5 to 50 weight percent of a first ethylene/α-olefin interpolymer having a density from 0.870 to less than, or equal to, 0.903 g/cm$^3$; and
   B) from 1 to 25 weight percent, based on the total weight of the thermoplastic blend composition, of an extender, consisting of a second ethylene/α-olefin interpolymer, other than component A)(b), and having the following properties: (a) a density of at least 0.855, and less than, or equal to, 0.8900 g/cm$^3$ and (b) a Brookfield Viscosity, at 350° F., from 3000 cP to 17,000 cP, and wherein the second ethylene/α-olefin interpolymer is a copolymer; and at least one additive selected from the group consisting of fillers, antioxidants, cling additives, antiblock additives, colorants, pigments, waxes, nucleating agents, extender oils, flame retardants, tackifiers, and combinations thereof, and wherein the melt index of said thermoplastic blend composition is increased by at least 5 percent, relative to that of said thermoplastic polyolefin composition.

2. The thermoplastic blend composition of claim 1, wherein Component A) is present in an amount from 80 to 98 weight percent, based on the total weight of the thermoplastic blend composition; and Component B) is present in an amount from 2 to 20 weight percent, based on the total weight of the thermoplastic blend composition, and wherein the second ethylene/α-olefin interpolymer has (a) a density of less than 0.8800 g/cm³, and (b) a Brookfield Viscosity, at 350° F., of at least 3000 cP, but less than, or equal to, 17,000 cP; and wherein the melt index of said thermoplastic blend composition is increased by at least 10 percent, relative to that of said thermoplastic polyolefin composition.

3. The thermoplastic blend composition of claim 1, wherein Component A) is present in an amount from 85 to 97 weight percent, based on the total weight of the thermoplastic blend composition; and Component B) is present in an amount from 2 to 20 weight percent, based on the total weight of the thermoplastic blend composition, and wherein the second ethylene/α-olefin interpolymer has (a) a density of less than 0.8800 g/cm³, and (b) a Brookfield Viscosity, at 350° F., of at least 3000 cP, but less than, or equal to, 17,000 cP; and wherein the melt index of said thermoplastic blend composition is increased by at least 15 percent, relative to that of said thermoplastic polyolefin composition.

4. The composition of claim 1, 2, or 3, wherein the interpolymer of Component B is a substantially linear ethylene/α-olefin copolymer.

5. A film, fiber, coating, or molded article formed from the composition of claim 1.

6. The composition of claim 1, wherein Component B) is present in an amount from 2 to 20 weight percent, based on the total weight of the thermoplastic blend composition.

7. The composition of claim 1, wherein the second ethylene/α-olefin interpolymer has a density less than, or equal to, 0.870 g/cm³.

8. The composition of claim 1, wherein Component A) is present in an amount from 80 to 98 weight percent, based on the total weight of the thermoplastic blend composition.

9. The composition of claim 1, wherein Component A) is present in an amount from 85 to 97 weight percent, based on the total weight of the thermoplastic blend composition.

10. The composition of claim 1, wherein the second ethylene/α-olefin interpolymer has a Brookfield Viscosity, at 350° F., from 4,000 cP to 17,000 cP.

11. An article comprising at least one component formed from the composition of claim 1.

12. A thermoplastic blend composition consisting of:
A) from 75 to 99 weight percent, based on the total weight of the thermoplastic blend composition, of a thermoplastic polyolefin composition, which consists of the following:
   (a) from 50 to 83.5 weight percent of polypropylene, HDPE or a mixture thereof; and
   (b) from 16.5 to 50 weight percent of a first ethylene/α-olefin interpolymer having a density from 0.870 to less than, or equal to, 0.903 g/cc; and
B) from 1 to 25 weight percent, based on the total weight of the thermoplastic blend composition, of an extender consisting of a second ethylene/α-olefin interpolymer, other than component A)(b), and having the following properties: (a) a density of less than 0.8800 g/cm³, and (b) a Brookfield Viscosity, at 350° F., from 3000 cP to 17,000 cP, and wherein the second ethylene/α-olefin interpolymer is a copolymer; and one or more additives selected from the group consisting of antioxidants, cling additives, antiblock additives, colorants, pigments, waxes, nucleating agents, extender oils, flame retardants, tackifiers and combinations thereof; and wherein the melt index of said thermoplastic blend composition is increased by at least 5 percent relative to that of said thermoplastic polyolefin composition.

13. The composition of claim 1, wherein Component B) is present in an amount from 3 to 15 weight percent, based on the total weight of the thermoplastic blend composition.

14. An article comprising at least one component formed from the composition of claim 12.

15. The composition of claim 12, wherein Component A) is present in an amount from 85 to 97 weight percent, based on the total weight of the thermoplastic blend composition.

16. The composition of claim 12, wherein the second ethylene/α-olefin interpolymer has a density less than, or equal to, 0.870 g/cm³.

* * * * *